(12) United States Patent
Thompson et al.

(10) Patent No.: US 9,950,726 B2
(45) Date of Patent: Apr. 24, 2018

(54) COMBINATION DOLLY-PALLETS

(71) Applicant: Loadhog Limited, Sheffield (GB)

(72) Inventors: Benjamin Joel Thompson, Johnson Creek, WI (US); Scott James Buss, Watertown, WI (US); Robert Guy Nussbaum, Oconomowoc, WI (US)

(73) Assignee: Loadhog Limited (GB)

( * ) Notice: Subject to any disclaimer, the term of this patent is extended or adjusted under 35 U.S.C. 154(b) by 0 days.

(21) Appl. No.: 15/133,724

(22) Filed: Apr. 20, 2016

(65) Prior Publication Data

US 2016/0311453 A1 Oct. 27, 2016

Related U.S. Application Data

(60) Provisional application No. 62/196,134, filed on Jul. 23, 2015.

(30) Foreign Application Priority Data

| Apr. 24, 2015 | (GB) | 1507008.9 |
| Mar. 1, 2016 | (GB) | 1603565.1 |
| Apr. 19, 2016 | (GB) | 1606814.0 |

(51) Int. Cl.
*B62D 33/08* (2006.01)
*B62B 3/02* (2006.01)
(Continued)

(52) U.S. Cl.
CPC ............. *B62B 3/022* (2013.01); *B60P 3/077* (2013.01); *B60T 1/14* (2013.01); *B60T 3/00* (2013.01); *B62B 5/0093* (2013.01); *B62B 5/049* (2013.01); *B64F 1/16* (2013.01); *B65D 19/0026* (2013.01); *B65D 19/0028* (2013.01); *B65D 19/42* (2013.01); *B62B 2206/003* (2013.01);
(Continued)

(58) Field of Classification Search
CPC ....... B62B 3/022; B62B 5/049; B62B 5/0093; B62B 2206/003; B65D 19/0028; B65D 19/0026; B65D 19/42; B65D 2519/00273; B65D 2519/00348; B65D 2519/00407; B65D 2519/00288; B65D 2519/00323; B65D 2519/00333; B65D 2519/00338; B65D 2519/00781; B60P 3/077; B64F 1/16; B60T 3/00; B60T 1/14
See application file for complete search history.

(56) References Cited

U.S. PATENT DOCUMENTS 2,020,386 A * 11/1935 Ulrich ............... B60T 1/14
188/5
2,192,337 A * 3/1940 Tiffany ............... B60B 33/06
108/80
(Continued)

FOREIGN PATENT DOCUMENTS

GB 2440802 2/2008
WO WO2010013082 A1 * 2/2010

*Primary Examiner* — Jacob B Meyer
(74) *Attorney, Agent, or Firm* — Clark Hill PLC; James R. Foley

(57) ABSTRACT

A displacement arrangement for use in a combination dolly-pallet includes an impelling member movable between first and second positions. A linkage is pivotally connected to the impelling member. When the impelling member moves between the first and second positions, the linkage moves pivotally relative to the impelling member to an extended position.

25 Claims, 19 Drawing Sheets

(51) Int. Cl.
　　　*B62B 5/00*　　　　(2006.01)
　　　*B62B 5/04*　　　　(2006.01)
　　　*B60T 1/14*　　　　(2006.01)
　　　*B65D 19/42*　　　(2006.01)
　　　*B60P 3/077*　　　(2006.01)
　　　*B60T 3/00*　　　　(2006.01)
　　　*B64F 1/16*　　　　(2006.01)
　　　*B65D 19/00*　　　(2006.01)

(52) U.S. Cl.
　　　CPC .............. *B65D 2519/00273* (2013.01); *B65D 2519/00288* (2013.01); *B65D 2519/00323* (2013.01); *B65D 2519/00333* (2013.01); *B65D 2519/00338* (2013.01); *B65D 2519/00348* (2013.01); *B65D 2519/00407* (2013.01); *B65D 2519/00781* (2013.01)

(56) References Cited

U.S. PATENT DOCUMENTS

| | | | | |
|---|---|---|---|---|
| 2,812,189 | A * | 11/1957 | Geldhof | D06F 39/125 16/34 |
| 2,843,392 | A * | 7/1958 | Simpkins | B60B 33/06 280/43.14 |
| 3,054,623 | A * | 9/1962 | Simpkins | B60B 33/06 16/33 |
| 3,216,531 | A * | 11/1965 | Hutchinson | B60P 1/02 188/5 |
| 3,247,931 | A * | 4/1966 | Bunn | B62B 5/0093 188/5 |
| 3,710,895 | A * | 1/1973 | Freedman | B60T 1/14 188/2 R |
| 4,073,369 | A * | 2/1978 | Nordskog | B60T 1/14 188/32 |
| 6,016,580 | A * | 1/2000 | Heimbrock | A61G 1/0225 5/610 |
| 6,098,761 | A * | 8/2000 | Kooima | B60T 1/005 188/23 |
| 6,264,006 | B1 * | 7/2001 | Hanson | A61G 7/0528 188/1.12 |
| 7,213,820 | B2 * | 5/2007 | Drummond | B60B 33/0005 280/47.34 |
| 7,537,222 | B2 * | 5/2009 | Hadar | B62B 5/049 280/43.12 |
| 7,810,822 | B2 * | 10/2010 | Figel | A61G 1/04 188/29 |
| 8,006,985 | B2 * | 8/2011 | Facey | B60T 1/14 188/5 |
| 8,292,309 | B2 * | 10/2012 | Fan | B60B 37/10 280/43.14 |
| 8,403,344 | B2 * | 3/2013 | Carver | B60T 1/14 280/30 |
| 8,511,693 | B2 * | 8/2013 | Gass | B25H 1/04 280/43.14 |
| 8,888,109 | B2 * | 11/2014 | Stubbs | B62B 5/0006 280/30 |
| 8,888,110 | B2 * | 11/2014 | Sadeh | B62B 3/02 280/30 |
| 9,045,253 | B2 * | 6/2015 | Hacko | B62B 5/0433 |
| 2005/0002766 | A1 * | 1/2005 | Hartmann | B62B 5/06 414/467 |
| 2007/0102599 | A1 * | 5/2007 | Lin | B62B 5/0083 248/129 |
| 2007/0186827 | A1 * | 8/2007 | Loftus | B65D 19/0016 108/57.15 |
| 2009/0236809 | A1 * | 9/2009 | Carver | B60T 1/14 280/43.12 |
| 2010/0147341 | A1 * | 6/2010 | Li | E04H 12/2246 135/16 |
| 2010/0187782 | A1 * | 7/2010 | Facey | B60T 1/14 280/30 |
| 2016/0311453 | A1 * | 10/2016 | Thompson | B60P 3/077 |

\* cited by examiner

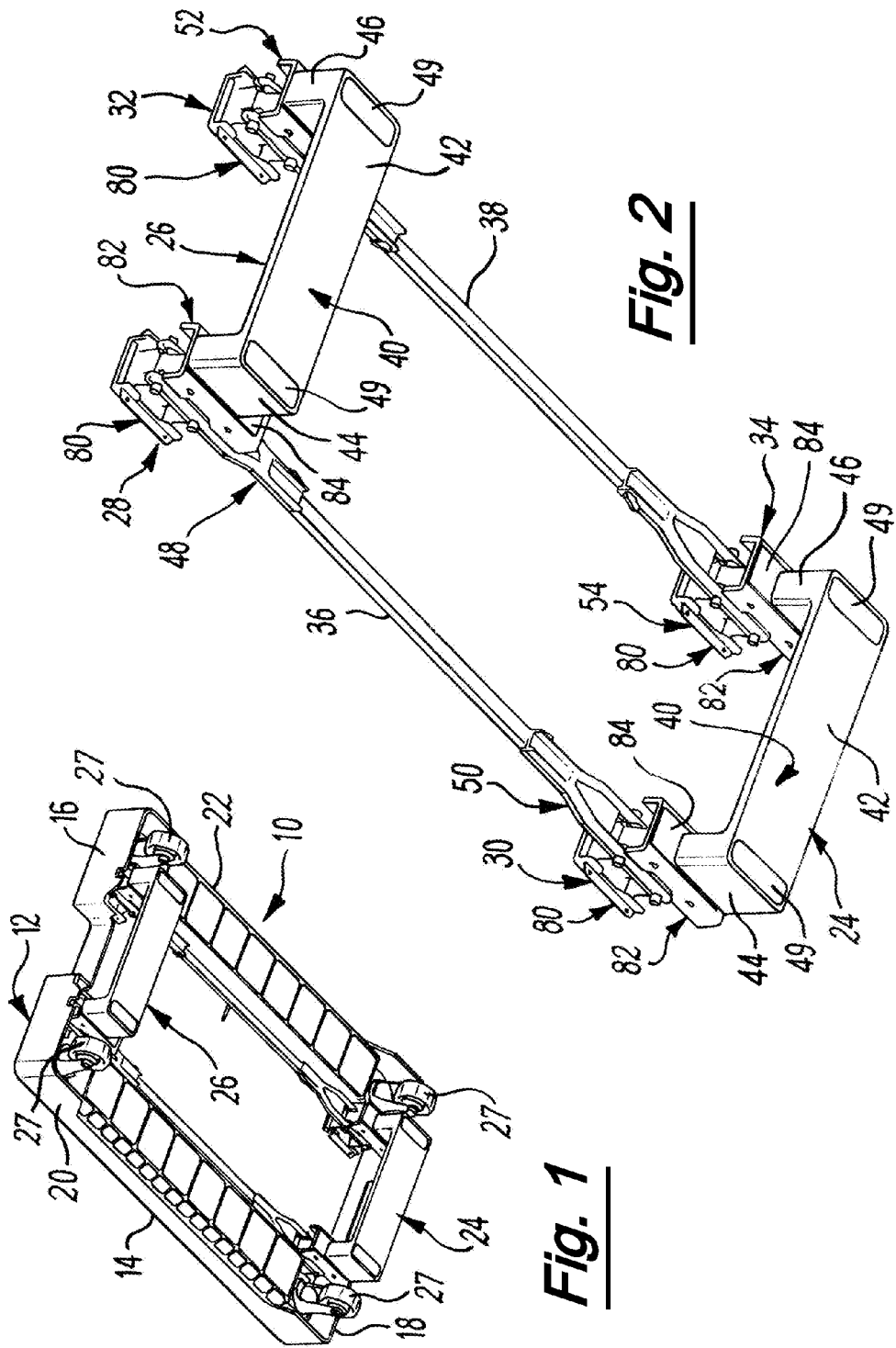

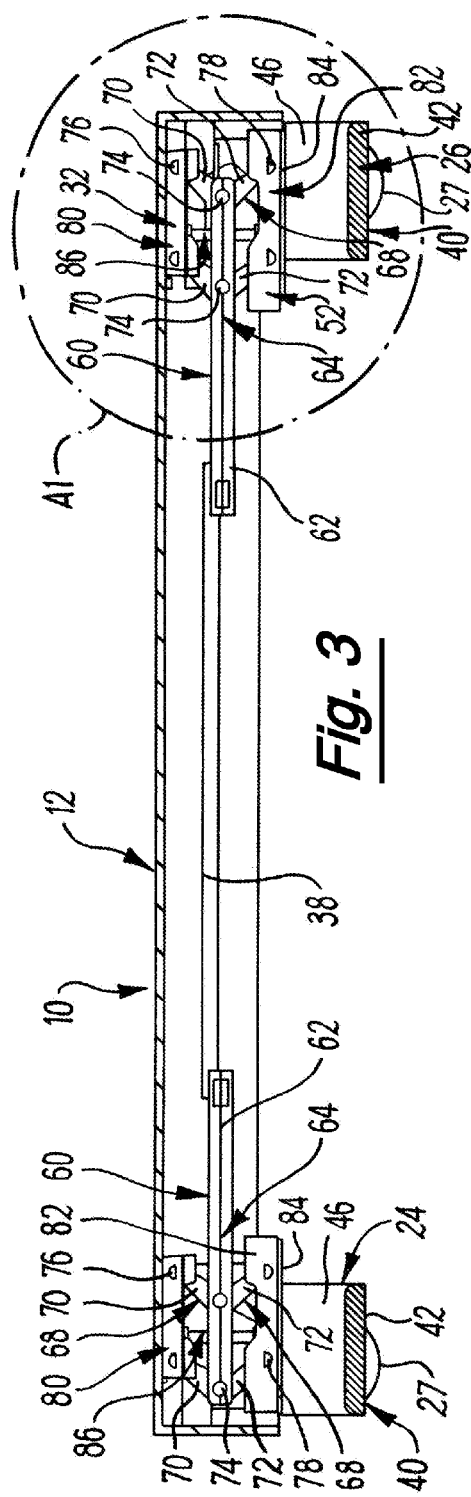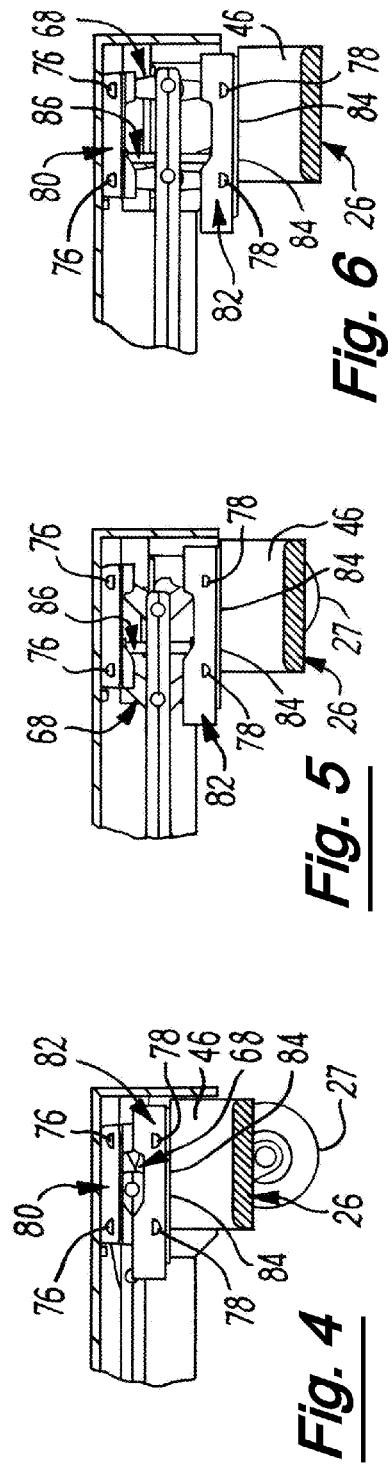

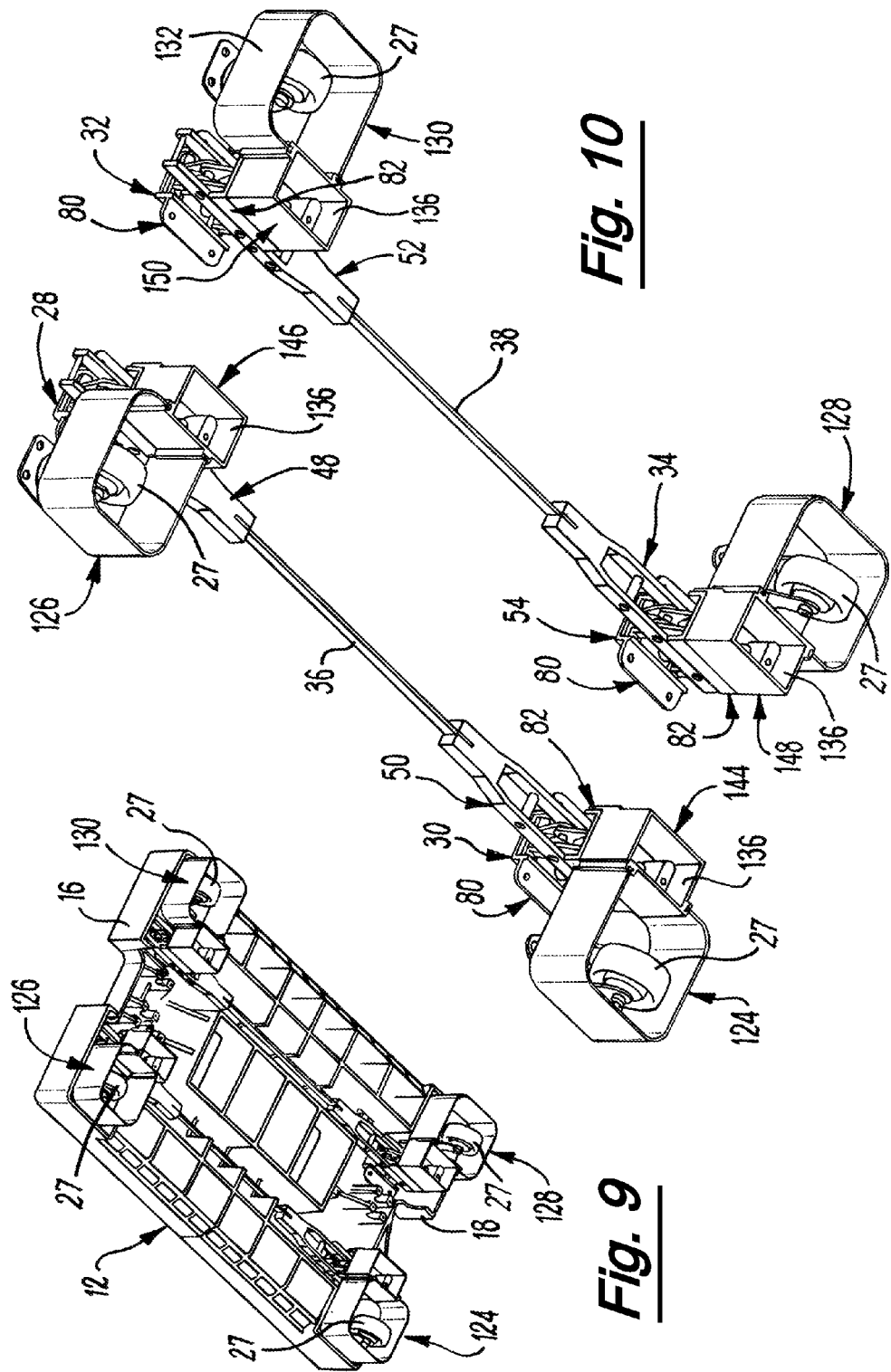

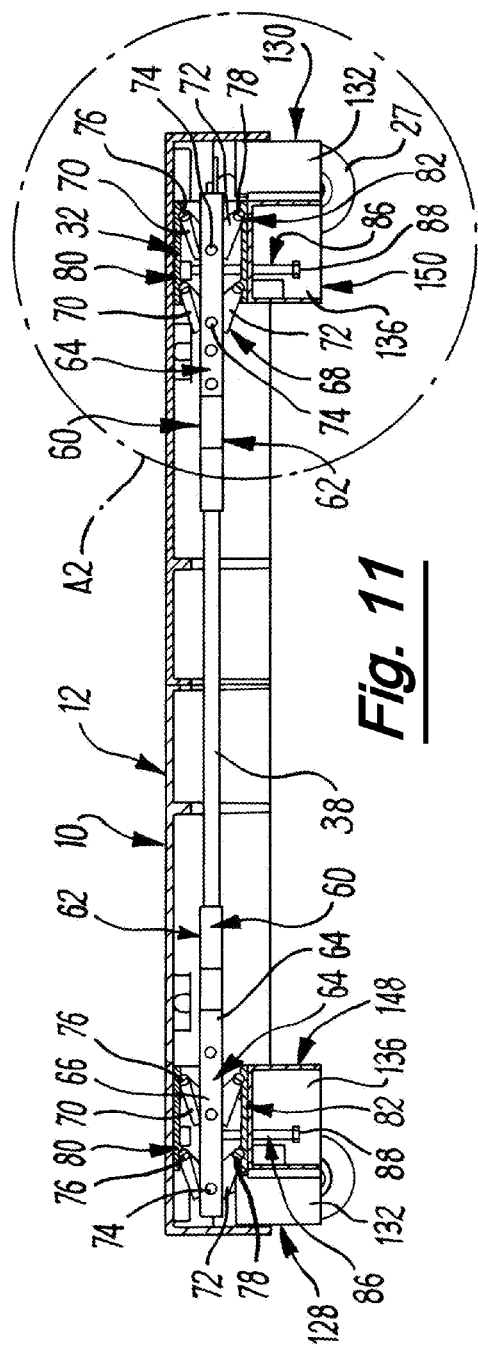

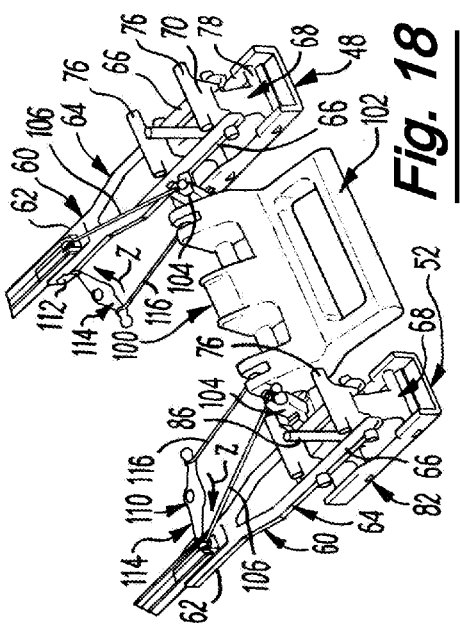
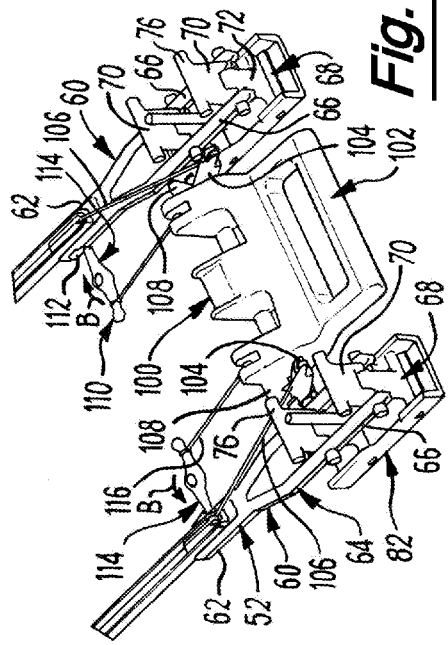

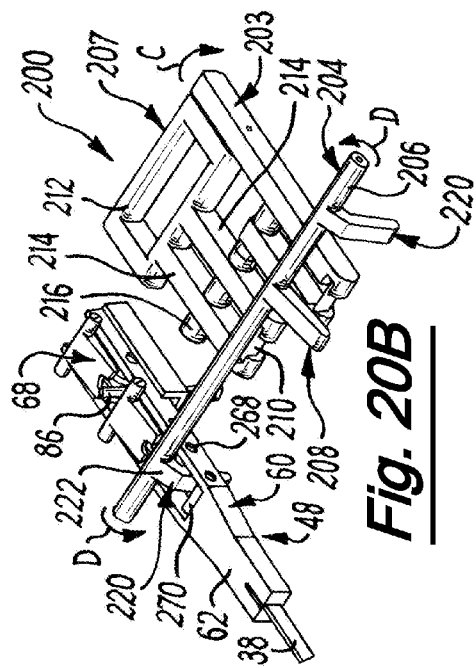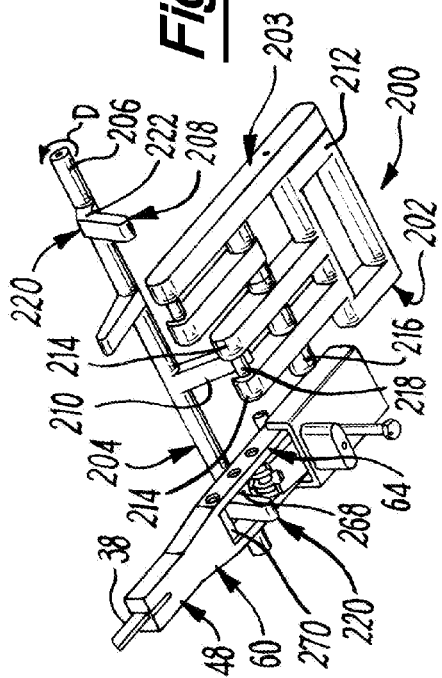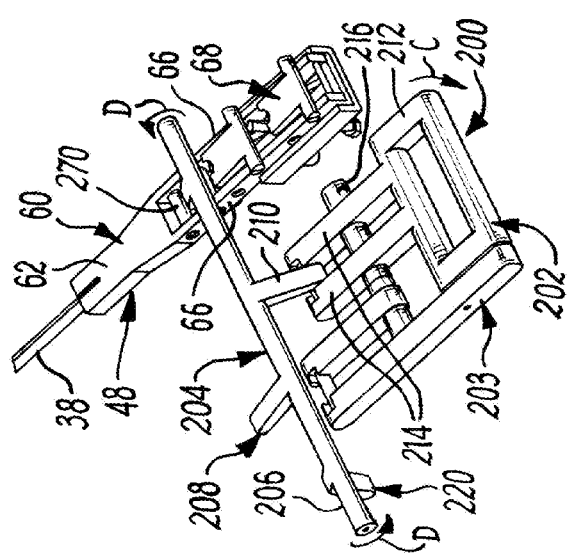

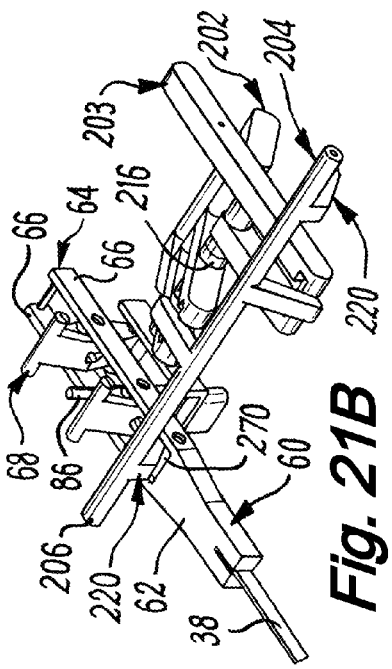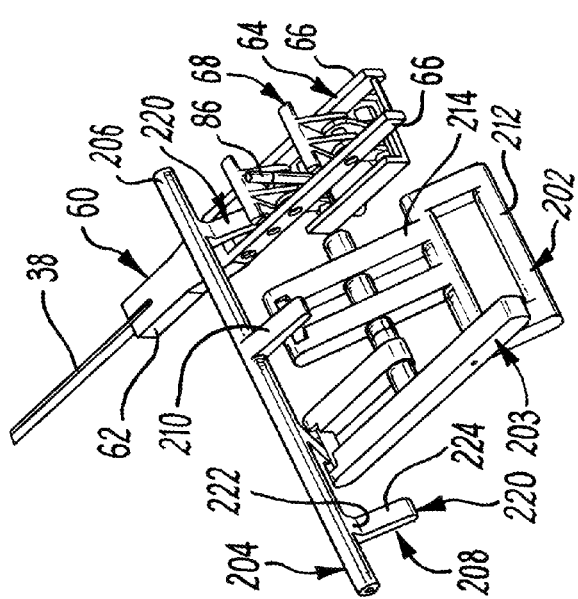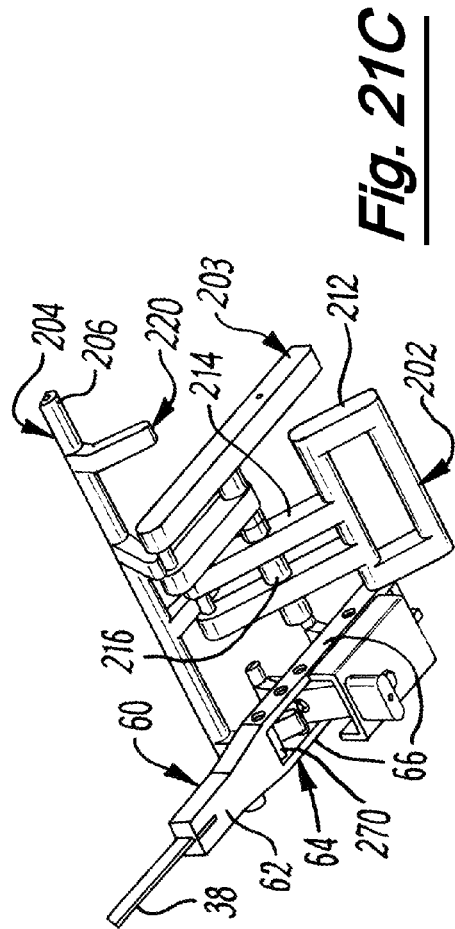

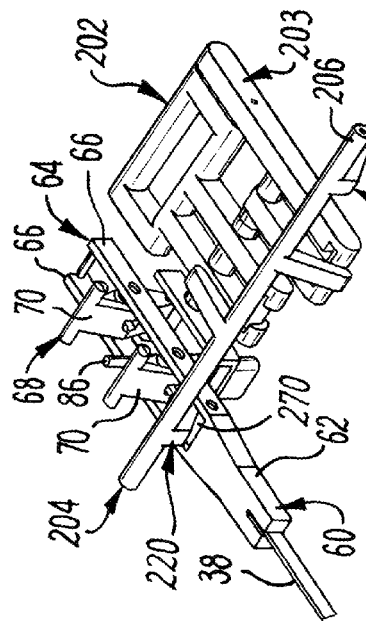
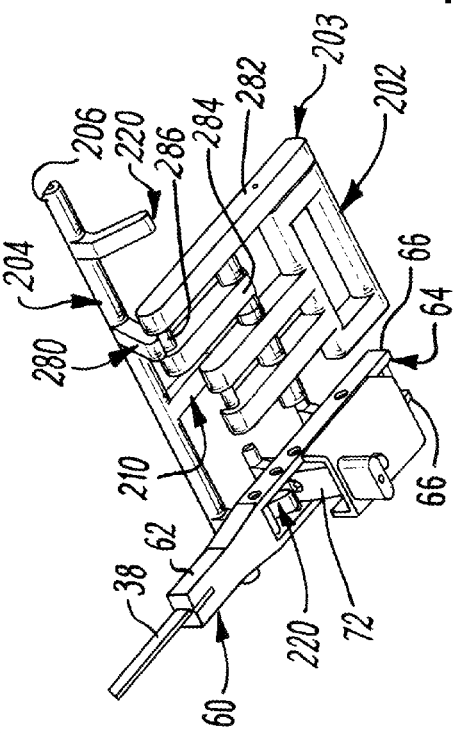
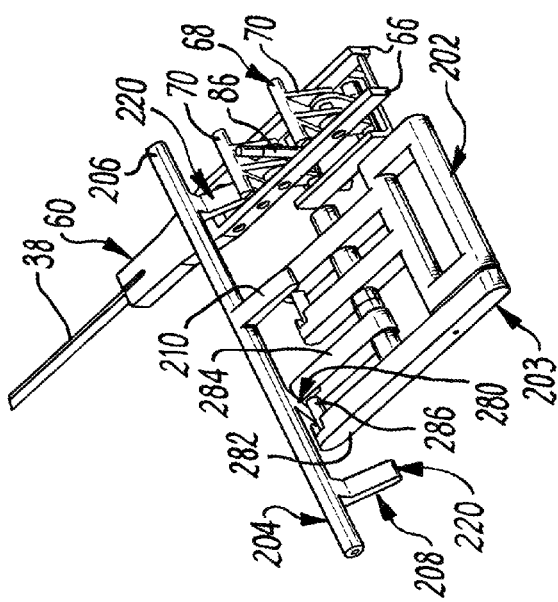

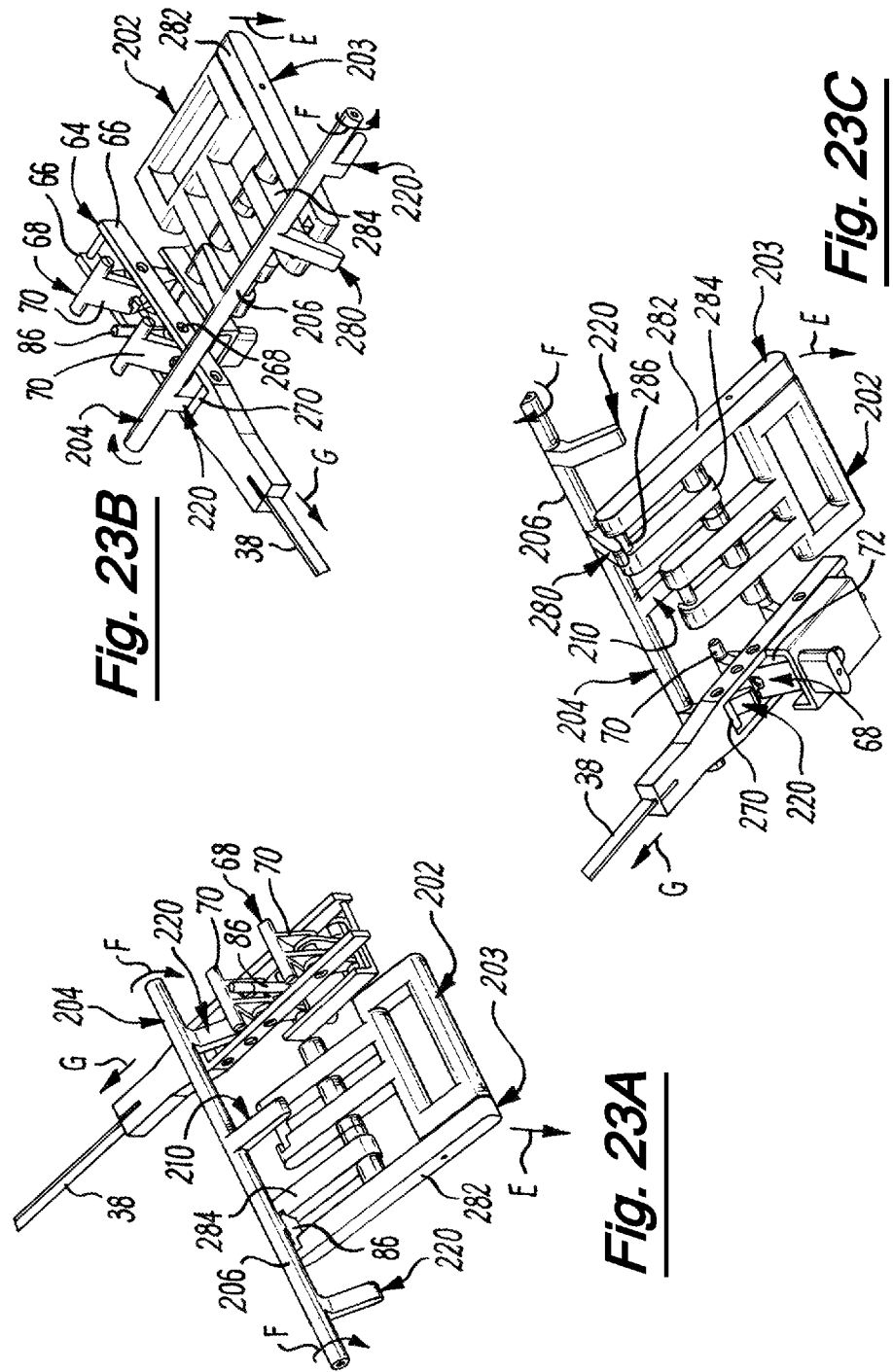

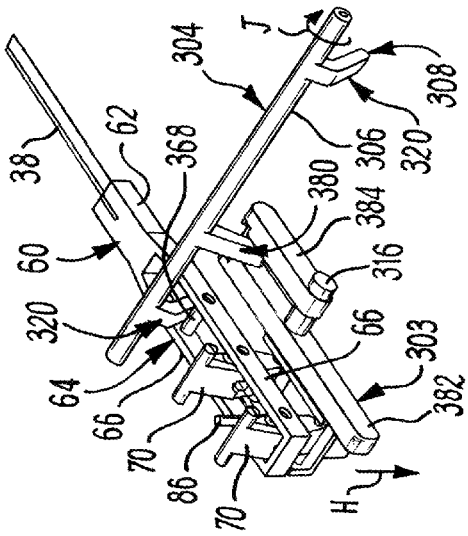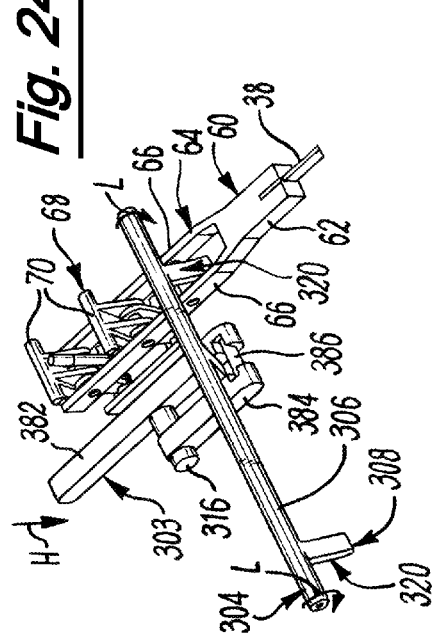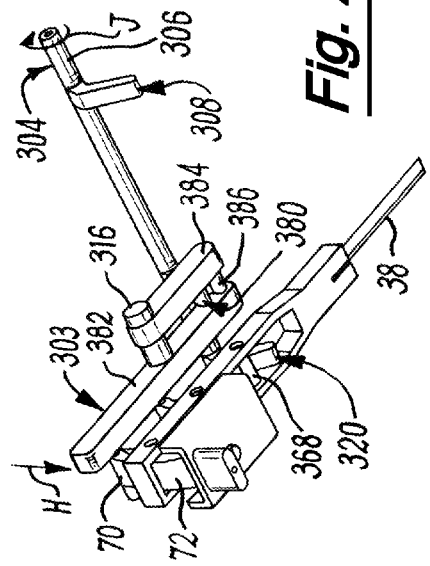

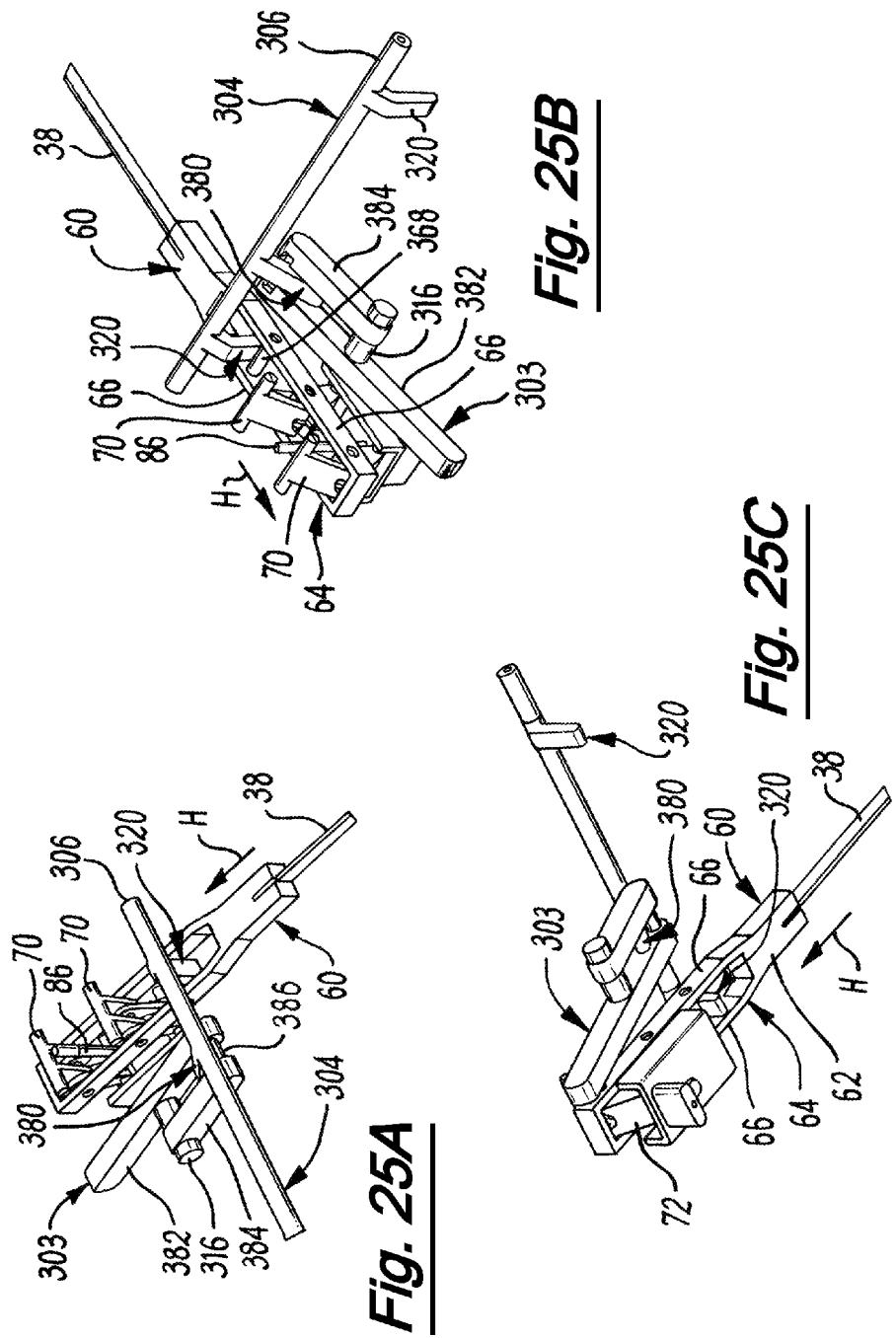

COMBINATION DOLLY-PALLETS

PRIORITY CLAIM

This application claims priority of U.S. provisional application Ser. No. 62/196,134 filed 23 Jul. 2015. This application also claims priority from: U.K. patent application No. 1507008.9 filed 24 Apr. 2015, and U.K. patent application No. 1603565.1 filed 1 Mar. 2016, and U.K. patent application No. 1606814.0 filed 19 Apr. 2016.

BACKGROUND

This invention relates to combination dolly-pallets. This invention also relates to displacement arrangements for use in combination dolly-pallets. This invention also relates to support assemblies for use in combination dolly-pallets.

Combination dolly-pallets have retractable ground engaging members and wheels. They can be converted between an immobile pallet condition, in which the ground engaging members engage the ground, and a dolly condition, in which the ground engaging members are retracted, and the combination dolly-pallet can be moved along the ground on the wheels.

SUMMARY

According to one aspect of this invention, there is provided a displacement arrangement for use in a combination dolly-pallet, the displacement arrangement comprising: an impelling member movable between first and second positions; and a linkage pivotally connected to the impelling member; whereby, when the impelling member moves between the first and second positions, the linkage moves pivotally relative to the impelling member to an extended position.

In the embodiment described herein, the displacement arrangement provides the advantage that a pair of displacement arrangements can be connected to one another in alignment by an elongate connecting member, thereby allowing the distance between the displacement arrangements to be varied by selecting the length of the connecting member. This means that combination dolly-pallets of different sizes can be manufactured using identical displacement arrangements.

According to a further aspect of this invention, there is provided a support assembly comprising: a displacement arrangement as described above; a ground engaging arrangement movable between a ground engaging position and a retracted position; and a reaction portion; wherein the linkage extends between the reaction portion and the ground engaging arrangement; whereby, when the impelling member moves between the first and second positions, the linkage moves pivotally relative to the impelling member to move the ground engaging arrangement between the retracted position and the ground engaging position.

According to another aspect of this invention, there is provided a support assembly for use in a combination dolly-pallet, the support assembly comprising: no more than one ground engaging arrangement movable between a ground engaging position and a retracted position; a reaction portion; and a displacement arrangement comprising: an impelling member movable between first and second positions; and a linkage pivotally connected to the impelling member, the linkage extending between the reaction portion and the ground engaging arrangement; whereby, when the impelling member moves between the first and second positions, the linkage moves pivotally relative to the impelling member to move the ground engaging arrangement between the retracted position and the ground engaging position.

According to yet another aspect of this invention, there is provided a combination dolly-pallet comprising a body, a plurality of the support assemblies as described in one of the immediately preceding two paragraphs mounted on the body; and a drive assembly for driving the support assemblies.

The term "ground engaging" as used herein refers to the engagement of the ground or floor by the feature being so described.

When the impelling member is in the first position, the linkage may be in a closed position. When the impelling member is in the second position, the linkage may be in an open position.

The, or each, impelling member may have a connecting part and a holding part. The connecting part may be configured to allow the impelling member to be connected to another impelling member.

The holding part may comprise two arms extending from the connecting part. The linkage may be provided between the arms of the holding part. The linkage may be pivotally attached to the holding part. The linkage may be pivotally attached to the arms of the holding part.

The movement of the ground engaging arrangement from the retracted position to the ground engaging position may be a movement of the ground engaging arrangement away from the reaction portion.

The reaction portion may be a separate component attached to the body. Alternatively, the reaction portion may be part of the body.

The displacement arrangement may comprise a force applying arrangement and at least one transmission arrangement to transmit a force from the force applying arrangement to the, or each, impelling member to drive the impelling member from the first position to the second position. The, or each, transmission arrangement may extend between the force applying arrangement and the impelling member The force applying arrangement may comprise a lever arrangement pivotally movable from a rest position. The lever arrangement may be pivotally movable between the rest position and an operative position. When the lever arrangement is in the rest position, the, or each, impelling member may be in the first position.

When the lever arrangement is in the operative position, the, or each, impelling member may be in the second position. The force applying arrangement may apply said force to the, or each, support assembly when the force applying arrangement moves from the rest position.

The lever arrangement may be pivotally connected to the body. The lever arrangement may comprise a drive member. The drive member may be a drive lever. The drive lever may comprise a drive pedal. The drive lever may be pivotally movable from the rest position to drive the support assembly.

In a first embodiment, the lever arrangement may include at least one urging member for urging the, or each, transmission arrangement when the lever arrangement is moved from the rest position In the first embodiment, the, or each, transmission arrangement may comprise an elongate member, such as a wire, cable or a rod. In the first embodiment, the, or each, urging member may pull the elongate member when the lever arrangement is moved to the drive position.

In the first embodiment, the, or each, urging member and the drive lever may be pivotally connected to each other. The, or each, urging member may be moved by the drive lever when the lever arrangement is moved from the rest position. The drive lever may move pivotally relative to the, or each, urging member when the drive lever moves to the rest position.

In the second embodiment, the transmission arrangement may comprise a cam arrangement, which may comprise a rotatable main part. The main part may be elongate and may comprise a shaft. The shaft may be a camshaft. One version of the drive lever may be movable relative to the cam arrangement. Another version of the drive lever may be fixedly attached to the cam arrangement.

The cam arrangement may comprise an urging formation for urging the displacement arrangement so that the impelling member moves between the first position and the second position.

A plurality of the displacement arrangements may be provided. The cam arrangement may include two of the urging formations, each being operable on a respective one of the displacement arrangements.

The, or each, urging formation may extend radially from the main part. The, or each, urging formation may comprise a first elongate projection on the main part.

The, or each, first projection may have a bend therein, which may be an obtuse angled bend. The, or each, first elongate projection may be in the form of a finger.

The, or each, urging formation may be received by the impelling member. The, or each, urging formation may be received between the arms of the holding part of the impelling member.

The impelling member may include a pair of cross members extending between the arms of the holding part. The, or each, urging formation may be received between the cross members and may engage one of the cross members of the, or each, impelling member to urge the, or each, impelling member to the second position.

The, or each, urging formation may engage the other of the cross members of the, or each, impelling member to urge the impelling member towards the first position. In one embodiment, the cam arrangement may include a drive formation for engaging the lever arrangement. The drive formation may engage the drive lever.

The drive formation may be fixedly attached to the shaft. In this version of the drive lever, the drive lever may be movable relative to the cam arrangement.

The drive formation may be configured so that movement of the drive lever from the rest position can urge the drive formation and thereby rotate the cam arrangement in a drive direction to urge the impelling member to the second position. The drive formation may comprise a radially outwardly extending second elongate projection on the main part. The second elongate projection may be in the form of a second finger.

The drive lever may include an engaging member for engaging the drive formation. The engaging member may be a cross member.

Additionally or alternatively, the lever arrangement may comprise a fixed drive lever which is fixedly attached to the cam arrangement. The fixed drive lever may be fixedly attached at an end of the cam arrangement. Desirably, the fixed drive lever may be attached at an end of the shaft.

The lever arrangement may comprise two of the fixed drive levers. Each fixed drive lever may be attached at a respective opposite end of the cam arrangement. Each fixed drive lever may be attached at a respective opposite end of the shaft.

The fixed drive lever may be rotatable in the drive direction to rotate the cam arrangement also in the drive direction. The fixed drive lever may be rotatable in said drive direction from the rest position to the operative position.

The force applying arrangement may comprise at least one return assembly for returning the, or each, impelling member from the second position to the first position, thereby pivotally moving the, or each, linkage relative to the impelling member to move the, or each, ground engaging arrangement from the ground engaging position to the retracted position.

In the first embodiment, the, or each, return assembly may comprise a projection on the displacement arrangement and a detent member attached to the force applying arrangement. The, or each, detent member may be movably mounted on the body. The, or each, detent member may be attached to the force applying member by an elongate member, such as a wire, cable or rod. Desirably, the, or each, detent member comprises a pivotally movable detent lever, which may be pivotally mounted on the body.

The, or each, detent member may be movable between a projection urging position, in which the detent member can urge the respective projection, and a projection avoiding position, in which the, or each, detent member can avoid the respective projection.

When the force applying arrangement is in the rest position, the, or each, detent member may be in the projection urging position. When the force applying arrangement is moved from the rest position, the, or each, detent member may move to the projection avoiding position.

Movement of the force applying arrangement from the rest position may move the, or each, detent member between the projection urging position and the projection avoiding position.

When the, or each, detent member is in the projection urging position and the, or each, impelling member is in the second position, the, or each, detent member may engage the respective projection. When the, or each, detent member is in the projection urging position and the, or each, impelling member is in the second position, movement of the, or each, detent member towards the projection avoiding position may urge the respective impelling member towards the first position, thereby urging the, or each, ground engaging arrangement to the retracted condition.

The, or each, detent member may be resiliently deformable. When the, or each, detent member is in the projection avoiding position and the respective impelling member is in the second position, movement of the force applying arrangement to the rest position may move the, or each, detent member across the respective projection as the, or each, detent member moves to the projection urging position.

The movement of the, or each, detent member across the respective projection may deform the, or each, detent member from a non-deformed condition. When the, or each, detent member reaches the projection urging position, the, or each, detent member returns to its non-deformed condition to engage the respective projection.

When the, or each, detent member is in the projection urging position and the, or each, impelling member is in the first position, movement of the force applying arrangement from the rest position may move the, or each, detent member to the projection avoiding position as the, or each, impelling member moves to the second position, thereby avoiding contact between the, or each, detent member and the respective projection during said movement of the impelling member to the second position.

In the second embodiment, the return assembly may include a return formation, which may be part of the cam arrangement. The return formation may be fixedly attached to the shaft.

The return assembly may further include a return lever, movable from a rest position of the return lever to an operative position of the return lever to urge the return formation and thereby to urge the, or each, impelling member towards the first position. The urging of the return formation by the return lever may rotate the cam arrangement.

When the return lever is in its rest position, the, or each, impelling member may be in the second position. When the return lever is in its operative position, the, or each, impelling member may be in the first position. Thus, rotation of the return lever from its rest position to its operative position may rotate the further cam arrangement to urge the, or each, impelling member towards the first position.

The rest position of the return lever may be a raised position thereof. The operative position of the return lever may be a depressed position thereof.

The return formation may be configured so that movement of the return lever from its rest position can urge the return formation in a return direction thereby to urge the, or each, impelling member towards the first position, said return direction being an opposite direction to the drive direction. The aforesaid movement of the return lever from its rest position can rotate the cam arrangement to urge the return formation in said return direction.

The return formation may comprise a radially outwardly extending third elongate projection on the main part. The third elongate projection may be in the form of a third finger.

The return lever may include an engaging member for engaging the return formation. The engaging member may be a cross member.

The return lever may be movable independently from the drive lever.

The return assembly may comprise a further cam arrangement for urging the impelling members from the second position to the first position. The further cam arrangement may comprise a further shaft, which may be a further camshaft. The further cam arrangement may include a further return formation. The further return formation may be fixedly attached to the further shaft.

The cam arrangement may be provided at a first end region of the body. The further cam arrangement may be provided at an opposite second end region of the body.

The return assembly may further include a further return lever, movable from a rest position of the further return lever to an operative position of the further return lever to urge the further return formation and thereby to urge the, or each, impelling member towards the first position. The urging of the further return formation by the further return lever may rotate the further cam arrangement.

When the further return lever is in its rest position, the, or each, impelling member may be in the second position. When the further return lever is in its operative position, the, or each, impelling member may be in the first position. Thus, rotation of the further return lever from its rest position to its operative position may rotate the further cam arrangement to urge the, or each, impelling member towards the first position.

The rest position of the further return lever may be a raised position thereof. The operative position of the further return lever may be a depressed position thereof.

The further return formation may be configured so that movement of the further return lever from its rest position can rotate the further cam arrangement in the aforesaid return direction, thereby to urge the, or each, impelling member towards the first position.

The further return formation may comprise a radially outwardly extending further elongate projection on the further shaft. The further elongate projection may be in the form of a finger.

The further return lever may include a further engaging member for engaging the further return formation. The further engaging member may be a further cross member.

The further return lever may be movable independently from the drive lever.

The combination dolly-pallet may have a drive lever at only one end. The combination dolly-pallet may have a return lever and a further return lever at respective opposite ends.

Additionally or alternatively, the return assembly may comprise a fixed return lever which is fixedly attached to the further cam arrangement. The fixed return lever may be fixedly attached at an end of the further cam arrangement. Desirably, the fixed drive lever may be attached at an end of the further shaft.

The return assembly may comprise two of the fixed return levers. Each fixed return lever may be attached at a respective opposite end of the further cam arrangement. Each fixed return lever may be attached at a respective opposite end of the further shaft.

The fixed return lever may be rotatable in the return direction to rotate the further cam arrangement also in the return direction. The fixed return lever may be rotatable from its rest position to its operative position to move the, or each, impelling member from the second position to the first position.

When the fixed return lever is in its rest position, the, or each, impelling member may be in the second position. When the fixed return lever is in its operative position, the, or each, impelling member may be in the first position. Thus, rotation of the fixed return lever from its rest position to its operative position may rotate the further cam arrangement to urge the, or each, impelling member towards the first position.

The rest position of the fixed return lever may be a raised position thereof. The operative position of the fixed return lever may be a depressed position thereof.

When the fixed drive lever is moved to from its rest position to its operative position, the fixed return lever is moved from its operative position to its rest position. When the fixed return lever is moved to from its rest position to its operative position, the fixed drive lever is moved from its operative position to its rest position.

The, or each, displacement arrangement may further include a guide arrangement to guide the aforesaid pivoting movement of the linkage relative to the impelling member. The, or each, guide arrangement may extend from the reaction portion to the ground engaging arrangement.

The, or each, guide arrangement may comprise a guide member, which may be elongate. The guide member may comprise a pin. The guide member may extend through the respective ground engaging arrangement The, or each, guide arrangement may comprise a resilient member. The resilient member may be a spring, such as a compression spring. The resilient member may move the ground engaging arrangement to the retracted position from the ground engaging position. When said impelling member moves from the second position towards the first position, the resilient member may move the ground engaging arrangement to the retracted position.

The guide arrangement may include a head attached to a lower end of the guide member. A resilient member may extend from the head along the guide member to the ground engaging arrangement. The resilient member may urge the ground engaging arrangement towards the reaction portion.

In a first embodiment, each ground engaging arrangement may comprise an elongate bearer portion, which may have a substantially flat lower surface.

Upwardly extending mounting members may be attached to the bearer portion at the opposite ends of the bearer portion to mount the bearer portion on the body. The bearer portion may extend between the mounting members.

The mounting members may connect the ground engaging arrangements to displacement arrangements within the body.

In a second embodiment, each of the ground engaging members may comprise a shield portion defining cavity. Each cavity may be a roller receiving cavity in which a respective roller can be received. Each shield portion may be attached to the respective mounting member and may extend laterally therefrom.

Each mounting member may define a guide cavity in which the guide arrangement is received.

The, or each, linkage may comprise a pair of link members, each link member being pivotally attached to the respective impelling member. The pair of link members may comprise an upper link member and a lower link member.

The upper link member may extend from the impelling member to the reaction portion. The upper link member may be pivotally attached to the reaction portion.

The lower link member may extend from the impelling member to the ground engaging arrangement. The lower link member may be pivotally attached to the ground engaging arrangement When the, or each, impelling member is in the first position, the upper and lower link members may extend along the impelling member. When the impelling member is in the second position, the upper and lower link members may extend transverse to the impelling member.

When the, or each, impelling member moves to the second position to move the ground engaging arrangement to the ground engaging position, each of the upper and lower link members moves to an over centre position beyond the position in which the upper and lower link members are aligned with the each other, thereby locking the ground engaging arrangement in said ground engaging position.

The, or each, linkage may comprise two sets of said upper and lower link members.

The, or each, ground engaging arrangement may comprise a ground engaging member and an attachment member attached to the ground engaging member. The linkage may be pivotally attached to the attachment member. A compression member, such as a compression pad, may be provided on the ground engaging member. The compression member may be compressible when the ground engaging member engages the ground. The compression member may be disposed between the ground engaging member and the attachment member.

The attachment member may be part of the ground engaging arrangement. Alternatively, the attachment member may be a separate component attached to the ground engaging arrangement.

BRIEF DESCRIPTION OF THE DRAWINGS

Embodiments of the invention will now be described with reference to the accompanying drawings, in which:

FIG. 1 is a perspective view from below of a first embodiment of a combination dolly-pallet;

FIG. 2 is a perspective view from below showing a plurality of support assemblies of the first embodiment of the combination dolly-pallet shown in FIG. 1;

FIG. 3 is a sectional side view of the first embodiment of the combination dolly-pallet, showing a pair of the support assemblies connected to each other;

FIG. 4 is a close up of the region marked A1 in FIG. 3, showing a linkage in a closed position;

FIG. 5 is a close up of the region marked A1 in FIG. 3, showing the linkage moving between the closed position and an open position;

FIG. 6 is a close up of the region marked A1 in FIG. 3, showing the linkage in the open position;

FIG. 9 is a perspective view from below of a second embodiment of a combination dolly-pallet;

FIG. 10 is a perspective view from below showing a plurality of support assemblies of the second embodiment of the combination dolly-pallet shown in FIG. 9;

FIG. 11 is a sectional side view of the second embodiment of the combination dolly-pallet, showing a pair of the support assemblies connected to each other;

FIG. 12 is a close up of the region marked A2 in FIG. 11, showing a linkage in a closed position;

FIG. 13 is a close up of the region marked A2 in FIG. 11, showing the linkage in the open position;

FIGS. 15 to 18 show the sequence of operation of two displacement mechanisms and a first embodiment of a force applying arrangement;

FIGS. 20A to 20C show three perspective views of a first step in the sequence of operation of a displacement arrangement and a second embodiment of the force applying arrangement;

FIGS. 21A to 21C show three perspective views of a further step in the sequence of operation of the displacement arrangement and the second embodiment of the force applying arrangement;

FIGS. 22A to 22C show three perspective views of another step in the sequence of operation of the displacement arrangement and the second embodiment of the force applying arrangement;

FIGS. 23A to 23C show three perspective views of yet another step in the sequence of operation of the displacement arrangement and the second embodiment of the force applying arrangement;

FIGS. 24A to 24C show three perspective views of a first step in the sequence of operation of a further return assembly and the second embodiment of the force applying arrangement;

FIGS. 25A to 25C show three perspective views of a further step in the sequence of operation of a further return assembly and the second embodiment of the force applying arrangement;

DESCRIPTION

Figure 7:
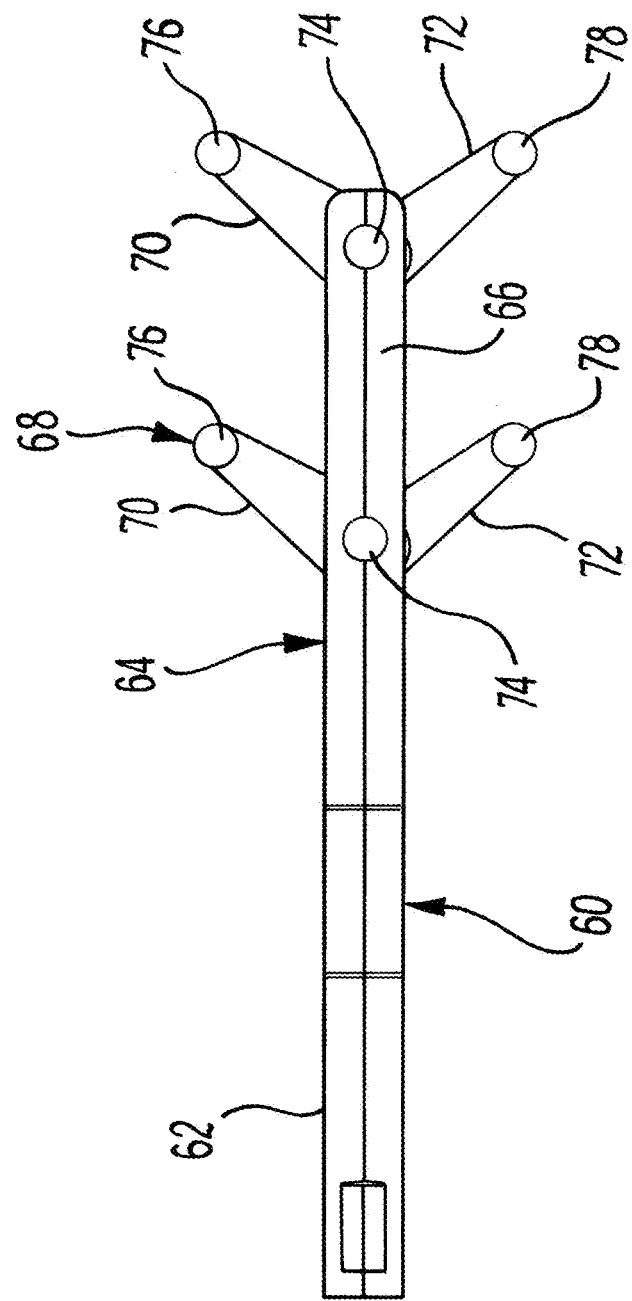
FIG. 7 is a close up side view of one of the impelling members.

FIG. 1 shows a first embodiment of a combination dolly-pallet 10 comprising a generally rectangular body 12 having a load supporting surface 14. The body 12 has opposite ends 16, 18 and opposite sides 20, 22 extending transverse to the ends 16, 18. A respective elongate ground engaging arrangement 24, 26 is provided at each end.

The combination dolly-pallet 10 also has a respective roller assembly at each corner of the body 12. Each roller assembly is in the form of a caster 27.

FIG. 2 shows support assemblies 28, 30, 32, 34. The support assemblies 28, 30 are disposed along the side 20 of the body. The support assemblies 32, 34 are disposed along the side 22 of the body. The support assemblies 28, 30 are connected to each other by an elongate connecting member 36. The support assemblies 32, 34 are connected to each other by an elongate connecting member 38.

Each elongate ground engaging arrangement 24, 26 comprises an elongate bearer portion 40, having a substantially flat lower surface 42. Upwardly extending mounting members 44, 46 are attached to the bearer portion 40 at the opposite ends of the bearer portion 40 to mount the bearers on the body 12. The bearer portion 40 extends between the mounting members 44, 46.

The mounting members 44, 46 connect the ground engaging arrangements 24, 26 to four displacement arrangements 48, 50, 52, 54 within the body 12, as described below.

The ground engaging arrangements 24, 26 are vertically movable between a ground engaging position and a retracted position, as shown in FIGS. 4 to 6. Such movement of the ground engaging arrangements 24, 26 has the effect of converting the combination dolly-pallet 10 between a pallet condition, when the ground engaging arrangements 24, 26 are in the ground engaging positions, and a dolly condition, when the ground engaging arrangements 24, 26 are in the retracted positions. The lower surface 42 of each bearer portion 40 engages the ground when the ground engaging arrangements are in the ground engaging positions.

The mounting members 44, 46 and the bearer portions 40 may be formed integrally with each other, for example by injection moulding.

In the dolly condition, only the casters 27 engage the ground. Therefore, the combination dolly-pallet 10 can be used as a dolly, and moved along the ground by being rolled along the casters 27.

In the pallet condition, the ground engaging arrangements 24, engage the ground in the ground engaging position thereby rendering the combination dolly-pallet 10 immobile. Thus, when the combination dolly-pallet 10 is in the pallet condition, it can be used as a pallet.

In the ground engaging position, the ground engaging arrangements 24, 26 do not lift the casters 27 off the ground, i.e. in the ground engaging position, the casters 27 as well as the ground engaging arrangements 24, 26 engage the ground.

Each of the support assemblies 28, 30, 32, 34 includes a respective one of the displacement arrangements 48, 50, 52, 54 for moving the ground engaging arrangements 24, 26 between the retracted and ground engaging positions. In the embodiment described herein, the combination dolly-pallet 10 comprises a respective one of the displacement arrangements 48, 50, 52, 54 for each mounting member.

Figure 8:
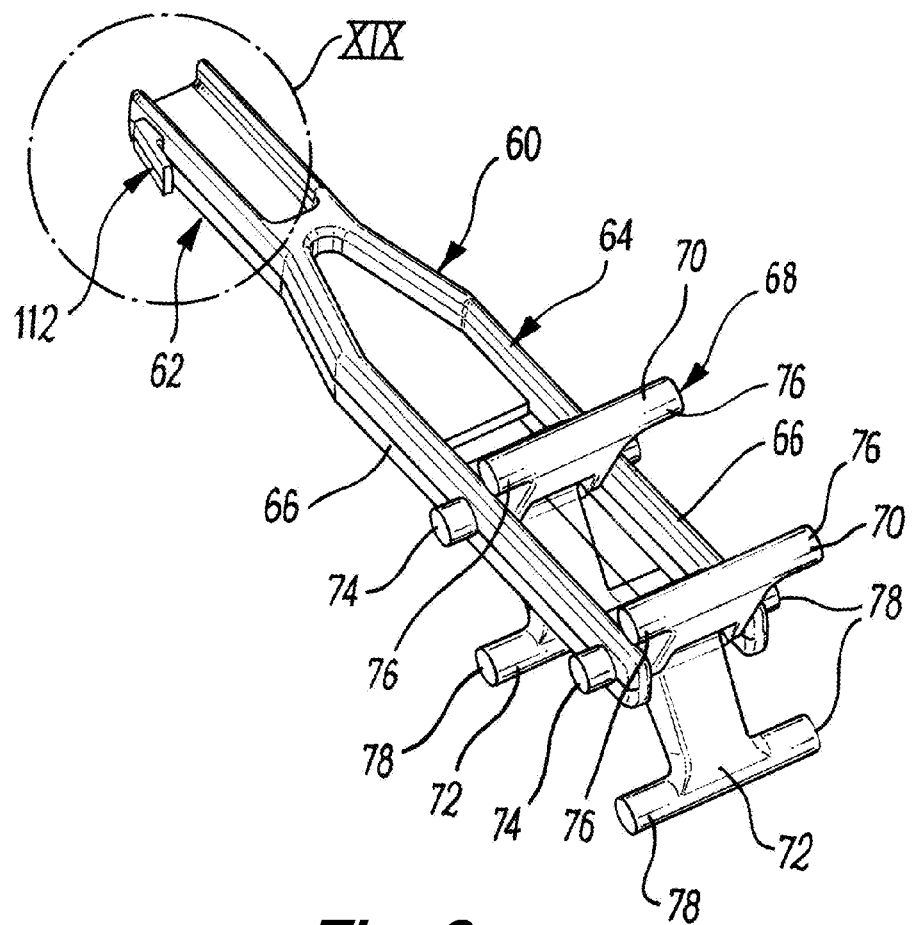
FIG. 8 is a close up perspective view of the impelling member shown in FIG. 7.

As shown in FIGS. 2 to 6, each of the displacement arrangements 48, 50, 52, 54 comprises an elongate impelling member 60. FIGS. 7 and 8 show close up side and perspective views of one of the impelling members 60, which comprises a connecting part 62 and a holding part 64. The connecting part 62 allows the impelling member 60 to be connected to another impelling member 60 being part of, for example, the ground engaging arrangement 54 (see FIG. 3), as explained below.

The holding part 64 comprises two arms 66 extending from the connecting part 62. Two linkages 68 are provided between the arms 66 of the holding part 64. The linkage 68 comprises two sets of upper and lower link members 70, 72 pivotally connected to both arms 66.

The upper and lower link members 70, 72 of each set are pivotally attached to both arms 66 at a common pivot 74. Each upper link member 70 extends upwardly from the impelling member 60 and has an upper end with a pair of outwardly extending upper pivot portions 76 thereon. Each lower link member 72 extends downwardly from the impelling member 60 and has a lower end with a pair of outwardly extending lower pivot portions 78 thereon.

Each of the displacement arrangements 52, 54, 56, 58 further includes a reaction portion 80 for providing a reaction force, as explained below. Each reaction portion 80 is in the form of substantially flat plate having downwardly extending opposite skirt formations to which the upper link members 70 are pivotally connected at the upper pivot portions 76.

Each of the displacement arrangements 52, 54, 56, 58 also further includes an attachment member 82 attaching the link members to the ground engaging arrangements 24, 26. Each attachment member 82 is in the form of substantially flat plate having upwardly extending opposite skirt formations to which the lower link members 72 are pivotally connected at the lower pivot portions 78. In the embodiment shown, the mounting members 44, 46 are mounted on the underside of the attaching members 82.

A compression member, in the form of a compression pad 84, is provided between the attachment member 82 and the elongate ground engaging arrangement 24, 26. Alternatively, the attachment member may be part of the ground engaging arrangement, in which case, a compression pad may be provided on the lower surface 42 of the bearer portion 40.

The compression pad 84 provides the advantage, in the embodiment described herein, that the manufacturing tolerances of the ground engaging arrangements 24, 26 do not have to be as precise as they would without the compression pad 84, thereby reducing manufacturing costs.

Each of the displacement arrangements 52, 54, 56, 58 further includes a guide arrangement, in the form of a guide pin 86, attached to the reaction portion 80 and extending substantially vertically through the attachment member 82 and the mounting member. The guide pins 86 guide the movement of the attachment members 82 and the mounting members 44, 46, ensuring substantially vertical movement of the ground engaging arrangements 24, 26.

Each guide pin 86 extends from the reaction member 86 into the respective mounting member 44, 46 via an upper region thereof.

Each of the mounting members is hollow, defining a guide cavity 49 (see FIG. 2) into which the guide pin 86 is received.

The guide pin 86 includes a head 88 at the lower end and a resilient member in the form of a compression spring 90 arranged along the guide pin 86 between the head 88 and the upper region of the mounting member 44, 46 through which the guide pin 86 extends. The compression spring 90 of each guide pin 86 urges the respective mounting member 44, 46 towards the reaction portion 80, and thereby urge the ground engaging arrangements 24, 26 to the retracted positions.

When the ground engaging arrangements 24, 26 are in the ground engaging positions, the compression pads 84 are compressed to ensure that the ground engaging arrangements 24, 26 engage the ground with the casters 27, without any lifting of the body 12 off the ground.

As shown in the FIG. 2 and described briefly above, the displacement arrangements 48, 52 are connected to the displacement arrangements 50, 54 by respective elongate connecting members 36, 38, which extend along the respective sides 20, 22 of the body 12. Thus, movement of one of the displacement arrangements 48, 52 causes corresponding movement of the other displacement mechanism 50, 54 to which it is connected.

A second embodiment of the combination dolly-pallet 10 is shown in FIGS. 9 to 13 which comprises many of the same features of the first embodiment of the combination dolly-pallet 10 shown in FIGS. 1 to 8. Those features have been designated with the same reference numerals as the corresponding features in FIGS. 1 to 8.

The second embodiment shown in FIGS. 9 to 13 differs from the first embodiment in that the elongate ground engaging arrangements 24, 26 are replaced by individual ground engaging members 124, 126, 128, 130 disposed at respective corners of the body 12.

The ground engaging members 124, 126, 128, 130 are mounted on the body 12 by means of upwardly extending mounting members 144, 146, 148, 150. Each ground engaging member 124, 126, 128, 130 is mounted on the body by a respective one of the mounting members 144, 146, 148, 150.

Referring to FIG. 10, each of the ground engaging members 124, 126, 128, 130 comprises a shield portion 132 defining a roller receiving cavity 134 in which the respective caster 27 can be received. Each shield portion 132 is attached to the respective mounting member 144, 146, 148, 150, and extends laterally therefrom.

Each mounting member 144, 146, 148, 150 defines a guide cavity 136 in which the guide pin 86 is received, as shown in FIGS. 11, 12 and 13.

The ground engaging arrangements 24, 26 or the ground engaging members 124, 126, 128, 130 are movably mounted on the body 12, and can move between a retracted position and a ground engaging position.

In the case of the ground engaging arrangements 24, 26, the bearer portions 40 and the mounting members 44, 46 engage the ground when the ground engaging arrangements 24, 26 are in the grounds engaging positions.

In the case of the ground engaging arrangements 124, 126, 128, 130, the shield portions 132 and the mounting members 144, 146, 148, 150 engage the ground when the ground engaging arrangements 124, 126, 128, 130 are in the grounds engaging positions.

The mounting members 144, 146, 148, 150 and the shield portions 132 may be formed integrally with each other, for example by injection moulding. Alternatively, the mounting members 144, 146, 148, 150 and the shield portions 132 may be formed separately from each other and attached to one another after formation.

FIG. 11 shows a sectional side view of the second embodiment, similar to the sectional side view of the first embodiment shown in FIG. 3. The region A2 marked in FIG. 11 is shown in FIGS. 12 and 13 when the ground engaging member 130 is in the retracted position (FIG. 12) and in the ground engaging position (FIG. 13).

As shown in FIGS. 11, 12 and 13, the guide pin 86 is attached to the reaction member 80. The guide pin 86 extends through the attachment member 82 and through the upper region 151 of the mounting member 150. The compression spring 90 is provided on the guide pin 86 and extends from the head 88 to the aforesaid upper region 151 of the mounting member 150.

FIG. 12 shows the ground engaging member 130 in the retracted position and the compression spring 90 in a relaxed condition. FIG. 13 shows the ground engaging member 130 in the ground engaging position and the compression spring 90 in a compressed condition. When the compression spring 90 is compressed, it urges the ground engaging member 130 towards the reaction member 80.

Figure 14:
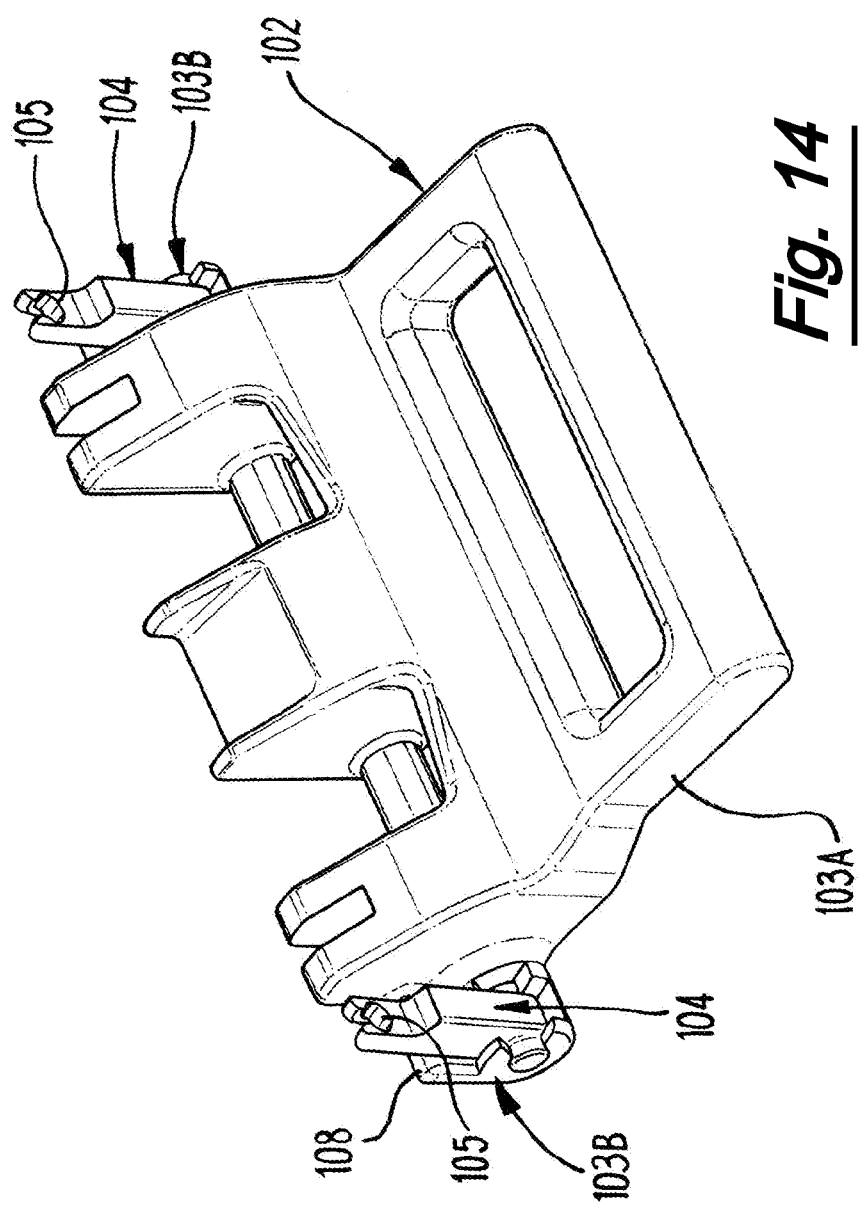
FIG. 14 is a perspective view of a drive pedal.

The combination dolly-pallet 10 further includes a force applying arrangement, generally designated 100. In the first embodiment, the force applying arrangement 100 comprising a drive lever in the form of a drive pedal 102 pivotally attached at one of the ends 14, 16 of the body 12. The drive pedal 102 is shown in FIG. 14.

The drive pedal 102 comprises a main body part 103A and a pair of outwardly extending lug portions 103B on opposite sides of the main body part 103A. The drive pedal 102 is pivotally attached to the body 12 by means of each of the lug portions 103B.

The force applying arrangement 100 further includes a pair of urging members 104 pivotally attached to the drive pedal 102. Each urging member 104 is pivotally attached to a respective one of the lug portions 103B.

Each urging member 104 defines a securing aperture 104A. An elongate transmission member 106, such as a rod, extends from each urging member 104 to a respective one of the displacement arrangements 48, 52. Each transmission member 106 is secured to the respective urging member 104 at the securing aperture 104A.

Each of the lug portions 103B includes an urging formation 108 for engagement with a respective one of the urging members 104. The drive pedal 102 is pivotally attached to the body 12 and can be pivoted from a rest position shown in FIGS. 15 and 17 and depressed downwardly, as shown in FIG. 16. When the drive pedal 102 is moved from the rest position, the urging formations 108 engage the urging members 104, causing them to move with the drive pedal 102.

The movement of the urging members 104 is transmitted by the transmission members 106 to the respective displacement arrangement 48, 52, thereby pulling the impelling members 60 in the direction indicated by the arrows W in FIG. 16, from a first position shown in FIG. 15 to a second position shown in FIG. 16.

The movement of the impelling members 60 from the first to the second positions causes the link members 70, 72 to move from a closed position, shown in FIG. 4 to an open position, shown in FIG. 6, through an intermediate position shown in FIG. 5. As a result, a reaction force is applied to the linkages 68 by the reaction portions 80 thereby causing the attaching members 82 and the ground engaging arrangements 24, 26 to move downwardly. When the linkages 68 reach the open position, shown in FIG. 6, the ground engaging arrangements 24, 26 are in the ground engaging positions.

When the linkages 68 reach the open position, the upper and lower link members 70, 72 of each set extend substantially at right angles to the respective impelling member 60 and are substantially aligned with each other.

The upper and lower link members 70, 72 of each set have stop formations that engage each other when the link members are in the open position. In order to lock the ground engaging arrangements 24, 26 in the ground engaging positions, the movement of the impelling members 60 to the second positions moves the link members 70, 72 of each set to an over centre position, in which the stop formations engage each other. The effect of this is that the compression spring on the guide pin urges the mounting members towards the reaction portion, thereby preventing inadvertent movement of the link members 70, 72 to the closed positions.

Figure 19:
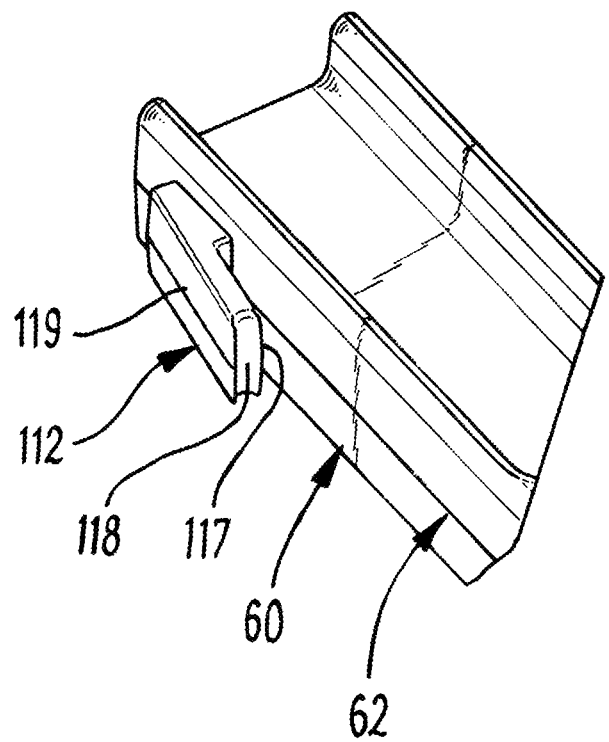
FIG. 19 is a close up of the region marked XIX in FIG. 8.

The combination dolly-pallet 10 further includes return assemblies 110 for returning the ground engaging arrangements 24, 26 from their ground engaging positions to their retracted positions. Each return assembly 110 comprises a projection 112 on the impelling members 60, and a respective detent lever 114 pivotally mounted on the body 12. FIG. 19 is a close up of the region marked XIX in FIG. 8, showing the projection 112.

Each projection 112 defines a gap 117 between the impelling member 60 and the projection 112, and a detent surface 118. Each projection 112 also has a sloping surface 119 extending at a shallow angle to the body 12, the sloping surface 119 leading to the detent surface 118.

Each detent lever 114 is connected to the drive pedal by an elongate connecting member 116, such as a wire or rod, and is pivotally movable between a projection urging position shown in FIG. 17 and a projection avoiding position shown in FIG. 16.

When the impelling members 60 are in the second positions, and the drive pedals 102 are in their rest positions, movement of the drive pedal 102 from the rest position pulls the connecting member 116, in the direction indicated by the arrow X, thereby causing the detent lever 114 to pivot as indicated by the arrow Z (see FIG. 18) from the projection urging position. This pivoting movement of the detent levers 114 causes the detent levers 114 to push against the detent surfaces 118 of the projections 112 and urge the impelling members 60 back to the first position.

A nudge of the projections 112 by the detent levers 114 is sufficient to move the ground engaging arrangements 24, 26 to the retracted positions. The detent levers 114 engage the detent surfaces and push the Impelling members 60 a sufficient distance to move the link members 70, 72 from their over centre positions shown in FIG. 6 to intermediate positions shown in FIG. 5.

In the intermediate position, the compression spring on the guide pin 86 urges the link members 70, 72 to the closed positions shown in FIG. 4, thereby urging the impelling members 60 to the first positions and the ground engaging arrangements 24, 26 to the retracted positions.

When the ground engaging arrangements 24, 26 are moved from the retracted positions to the ground engaging positions, the movement of the drive pedal 102 from the rest position causes the detent lever 114 to pivot as indicated by the arrow Y in FIG. 16 to a projection avoiding position, in which the detent levers 114 are moved out of the way of the projection 112 as the impelling members 60 are moved to the second position. This allows the projection 12 to move past the detent lever 114 in the direction indicated by the arrow W without engaging the detent lever 114 as the impelling member 60 moves to the second position.

The drive pedal 102 is returned to the rest position, and the detent lever 114 pivots as indicated by the arrow B in FIG. 17 to move across the sloping surface to engage the detent surface. The detent lever 114 is formed of a sufficiently resilient material to allow the detent lever 114 to deform as it moves across the sloping surface of the projection 112. The detent lever 114 returns to its non-deformed condition when the detent lever 114 has moved over the sloping surface, thereby engaging the detent surface.

Various modifications can be made without departing from the scope of the invention.

A second embodiment of a force applying arrangement, generally designated 200, along with the displacement arrangement 48, are shown in FIGS. 20A to 25C.

With the second embodiment, many of the features of the combination dolly-pallet described above are also present in the combination dolly-pallet 10 incorporating the second embodiment of the force applying arrangement 200. Those features have been designated in FIGS. 20A to 25C with the same reference numerals as in FIGS. 1 to 19.

The force applying arrangement 200 comprises a drive assembly comprising a drive lever in the form of a drive pedal 202 which is pivotally attached to the body 12 in the same manner as the first embodiment. The force applying arrangement 200 also includes a return assembly comprising a return lever 203, also pivotally attached to the body 12. The return lever 203 is disposed adjacent the drive pedal 202.

The force applying arrangement 200 further includes a cam arrangement 204 comprising an elongate main part, in the form of a camshaft 206, and a plurality of formations 208 configured either to be urged by the drive pedal 202 or the return lever 203, to urge the displacement arrangements, only one of which is shown in FIGS. 20A to 25C, namely the displacement arrangement 48, Each of the formations 208 is in the form of a respective elongate finger extending radially from the camshaft 206. The formations 208 comprise a drive formation 210 for engaging the drive pedal 202. The drive pedal 202 comprises a foot engaging portion 212 and a pair of parallel pivotally mounted projecting portions 214. A pivot member 216 extends through the projecting portions 212 to allow pivotal movement of the drive pedal 202 relative to the body 12. The drive pedal 202 includes a cross member 218 (see FIG. 20C) extending between adjacent portions 214 of the drive pedal 202 for engaging the drive formation 210.

Two further formations 208 on the camshaft 206 are two elongate urging formations 220 adjacent opposite ends of the camshaft 206. Each of the urging formations 220 is provided to urge the impelling members 60 from the first positions to the second positions and from the second positions towards the first positions.

Each of the urging formations 220 projects from the camshaft 206. Each urging formation 220 comprises an attaching portion 222 attached to the camshaft 206, and an elongate insertion portion 224 for insertion between the arms 66 of the holding part 64. Although only one of the impelling members 48 is shown, it will be appreciated that a further impelling member (not shown in FIGS. 20A to 25C) is also provided.

The insertion portion 224 of each urging formation 220 is inserted between the arms 66 of the respective impelling member 60. A forward cross member 268 and a rearward cross member 270 extends between the arms 66. The insertion portion 224 of each of the urging formations 220 is received between the cross members 268, 270.

The drive pedal 202 is pivotally movable from a rest position shown in FIGS. 20A to 20C by being rotated as indicated by the arrows C to a depressed position shown in FIGS. 21A to 21C. The drive formation 210 is configured so that, when the drive pedal 202 is so pivoted about the pivot member 216, the cross member 218 moves upwardly, thereby urging the drive formation 210 and the cam arrangement 204 to rotate, as indicated by the arrows D in FIGS. 20A to 20C.

Rotation of the camshaft 206 as indicated by the arrows D causes the urging formations 220 to engage the forward cross members 268 to urge the impelling members 60 from the first position shown in FIGS. 20A to 20C to the second position shown in FIGS. 21A to 21C, and thereby urge the linkage from the closed position shown in FIGS. 20A to 20C to the open position shown in FIGS. 21A to 21C. Thus, the depressing of the drive pedal 202 causes the ground engaging arrangements 24, 26, or the ground engaging members 124, 126, 128, 130, to move to the ground engaging position.

The linkage 68 is locked in the open position, with the link members 70, 72 in the over centre positions in the same way as explained above in connection with the first embodiment. When the drive pedal 202 is released, it returns to its rest position, with the ground engaging arrangements 24, 26 in the ground engaging position, as shown in FIGS. 22A to 22C.

The force applying arrangement 200 further includes a return formation 280 on the camshaft 206. The return formation 280 is one of the formations 208 and comprises an elongate finger extending radially from the camshaft 206.

The return lever 203 is operable on the return formation 280. The return lever 203 comprises a main lever portion 282 and a subsidiary lever portion 284. A cross member 286 extends between the main lever portion 282 and the subsidiary lever portion 284.

When the camshaft 206 is in the position shown in FIGS. 22A to 22C, the return formation 280 engages the cross member 286. Depression of the return lever 203, as indicated by the arrows E in FIGS. 23A to 23 return formation 280 and the camshaft 206 to rotate as indicated by the arrows F in FIGS. 23A to 23C The urging formations 220 engage the rearward cross member 270 disposed between the arms 66 and urge the impelling members 60 in the direction indicated by the arrows G in FIGS. 23A to 23C. This pushes the impelling members 60 a sufficient distance to move the link members 70, 72 from their over centre positions shown in FIGS. 22A to 22C to intermediate positions shown in FIGS. 23A to 23C.

By moving the link members 70, 72 to the positions shown in FIGS. 23A to 23C from the locked positions shown in FIGS. 22A, 22B, 22C, each of the compressed springs 90 urges the respective ground engaging arrangements 24, 26 or the ground engaging members 124, 126, 128, 130 to the retracted positions.

The return lever 203 can then be returned to its rest position, as shown in FIGS. 20A to 20C, by means of a spring (not shown).

The above described drive pedal 202 and return lever 203 are provided at one end of the body 12. FIGS. 24A to 24C show a further return assembly in a rest position. As can be seen from FIGS. 24A to 24C, the link members 70, 72 are in their open positions, which means that the ground engaging arrangements 24, 26 or the ground engaging members 124, 126, 128, 130 are in the ground engaging positions.

The further return assembly comprises a further return lever 303 pivotally attached to the body 12. In the embodiment shown, there is no pedal adjacent the further return lever 303.

The further return lever 303 includes a pivot member 316 at which the further return lever 303 is pivotally attached to the body 12. The further return lever 303 comprises a further main lever portion 382 and a further subsidiary lever portion 384. A cross member 386 extends between the main lever portion 282 and the subsidiary lever portion 284.

The further return assembly also includes a further cam arrangement 304 comprising a further camshaft 306 having a plurality of further formations 308 thereon. Each of the further formations 308 is in the form of an elongate finger extending radially from the further camshaft 306.

The further formations 308 comprise two further urging formations 320 adjacent opposite ends of the further camshaft 306. Each of the further urging formations 320 is provided to urge the impelling members 60 from the further positions to the first positions. The further urging formations 320 are substantially the same as the urging formations 220 described above.

Each further urging formation 320 is inserted between the arms 66 of the respective impelling member 60. A cross member 368 extends between the arms 66. The further urging formations 220 engages the cross member 368.

The further formations 308 include a further return formation 380 on the further camshaft 306. The further return formation 380 comprises an elongate finger extending radially from the camshaft 206. The further return lever 303 is operable on the further return formation 380.

When the further camshaft 306 is in the position shown in FIGS. 24A to 24C, the further return formation 380 engages the cross member 386. Depression of the further return lever 303, as indicated by the arrows H in FIGS. 24A to 24C moves the cross member 386 against the further return formation 380. This urges the further return formation 280 and the camshaft 206 to rotate as indicated by the arrows J in FIGS. 24A to 24C Referring to FIGS. 25A to 25C, the further urging formations 320 engage the cross member 368 disposed between the arms 66 and urge the impelling members 60 in the direction indicated by the arrows H in FIGS. 25A to 25C. This pushes the impelling members 60 a sufficient distance to move the link members 70, 72 from their over centre positions shown in FIGS. 24A to 24C to intermediate positions shown in FIGS. 25A to 25C.

The compression spring 90 on the guide pin 86 then urges the ground engaging arrangements 24, 26, or the ground engaging members 124, 126, 128, 130 to their retracted positions.

A further version of the force applying arrangement, generally designated 400, is shown in FIGS. 26A to 29B. The version shown in FIGS. 26A to 29B possesses many of the features shown in FIGS. 20A to 25D. In FIGS. 26A to 29B these features have been designated with the same reference numerals as in FIG. 20A to 25D.

Figure 26A:
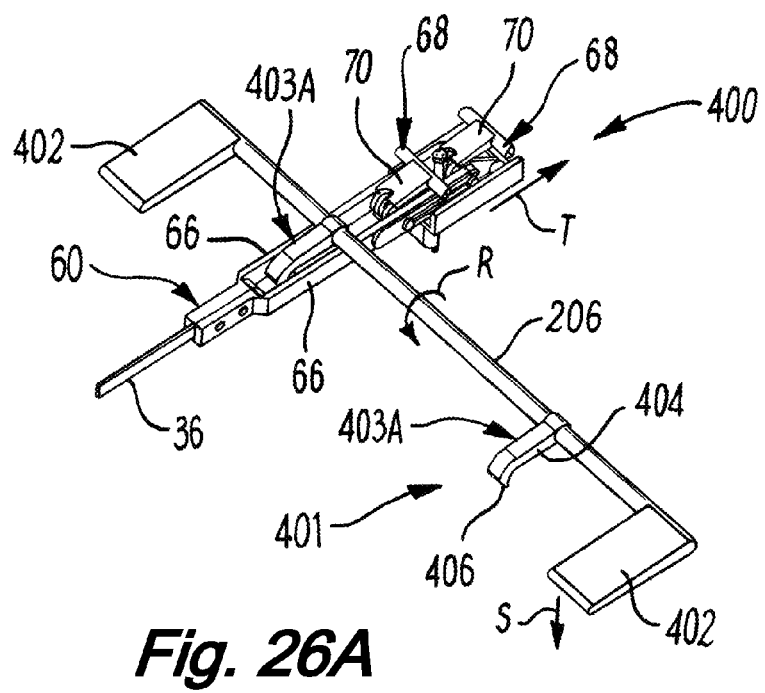
FIG. 26A is a perspective view of a further drive assembly with the impelling member in a first position.
Figure 26B:
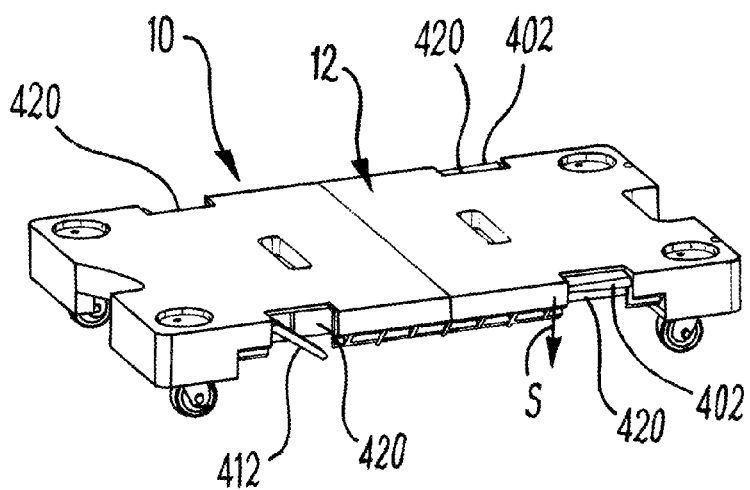
FIG. 26B is a perspective view showing a combination dolly-pallet having the drive assembly in the position shown in FIG. 26A.
Figure 27A:
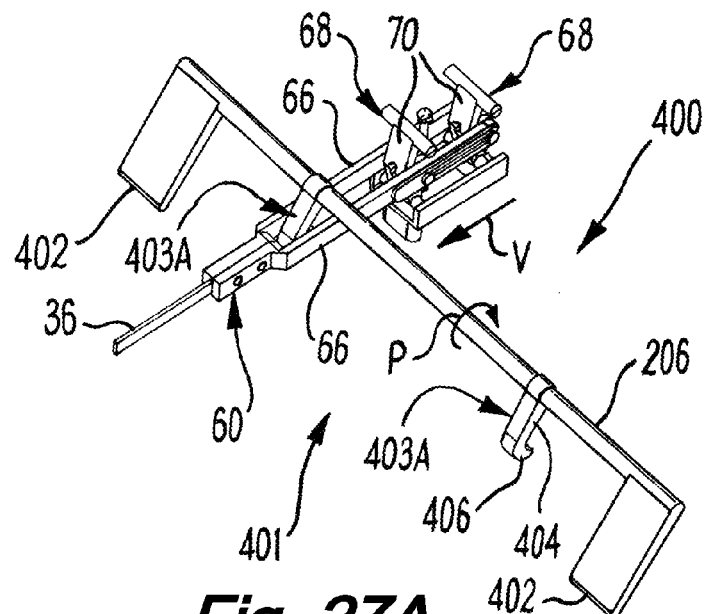
FIG. 27A is a perspective view of the further drive assembly with the impelling member in a second position.

FIGS. 26A and 26B show a drive assembly 401 for driving the impelling members 60 form a first position shown in FIG. 26A to a second position shown in FIG. 27A.

The drive assembly 401 comprises the camshaft 206. Although not shown in FIGS. 26A to 29B, the camshaft 206 is rotatably mounted in the body 12 of the dolly-pallet 10 for rotation about its main longitudinal axis as would be understood by the skilled person. Two fixed drive levers in the form of fixed drive pedals 402 are provided at the respective opposite ends of the camshaft 206. The fixed drive pedals 402 are fixedly attached to the camshaft 206, for example by welding. The camshaft 206 is also provided with elongate urging formations 404. The urging formations 404 are similar to the urging formations 220, in that the elongate urging formations project from the camshaft 206 and urge the impelling members 60 from the first position shown in FIGS. 26A and 28A to the second positions shown in FIGS. 27A and 29A.

The urging formations 404 differ from the urging formations 220, in that the urging formations 406 comprise an elongate attaching portion 404 attached to the camshaft 206 and a hook portion 406 at the end of the elongate attaching portion 404.

The hook portion 406 of each urging formation 403A is inserted between the arms 66 of the respective impelling members 60. The hook portion 406 engages a cross member 268 (see FIGS. 20B and 20C).

The fixed drive pedals 402 drive rotation of the camshaft 206 about its longitudinal axis, as shown by the arrow R in FIG. 26A. Such rotation is effected by pushing downwardly on one or other of the fixed drive pedals 402, as shown by the arrow S. The fixed drive pedals 402 are thus moved from a raised position shown in FIGS. 26A and 26B to a depressed position shown in FIGS. 27A and 27B.

The rotation of the camshaft 206 causes the urging formation 403A to push the cross member and urge the impelling member 60 in the direction indicated by the arrow T in FIG. 26A to its second position shown in FIG. 27A. As explained above, this movement of the impelling member cause the linkages 68 to move to their open position, shown in FIG. 27A.

Figure 27B:
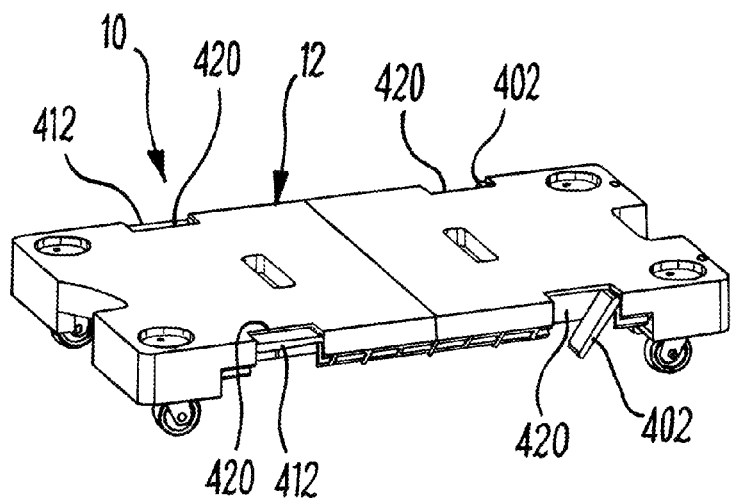
FIG. 27B is a perspective view showing a combination dolly-pallet having the fixed drive pedals in the depressed position.

FIGS. 26B and 27B show the dolly-pallet 10 with the force applying arrangement 400. FIG. 26B shows the fixed drive pedals 402 in the raised position, and FIG. 27B shows the fixed drive pedals 402 in the depressed position.

Figure 28A:
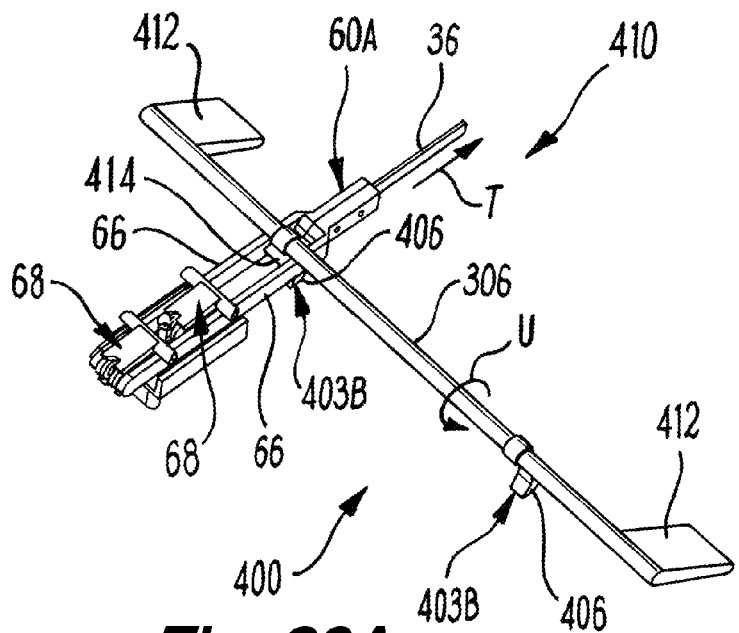
FIG. 28A is a perspective view of a further return assembly with the impelling member in a first position.
Figure 29A:
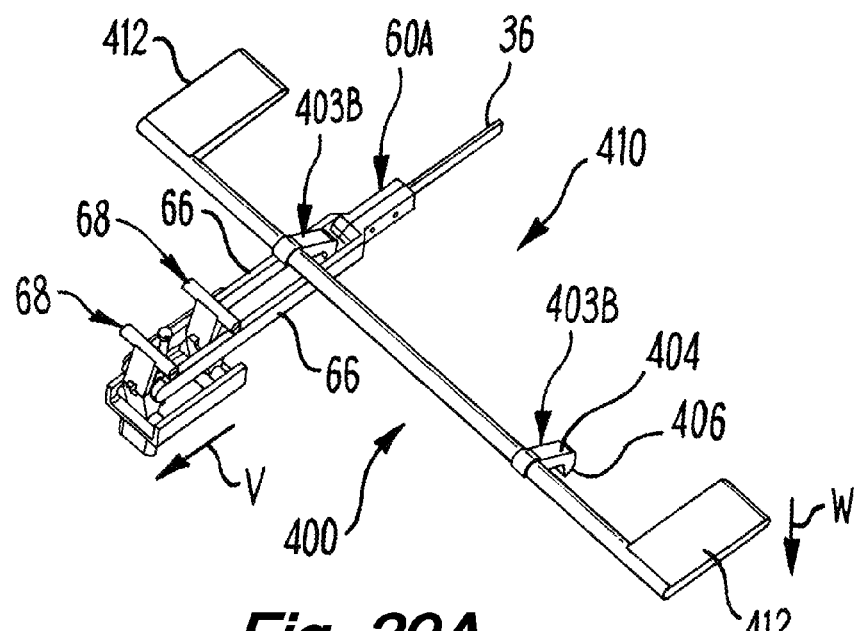
FIG. 29A is a perspective view of a further return assembly with the impelling member in a second position.
Figure 29B:
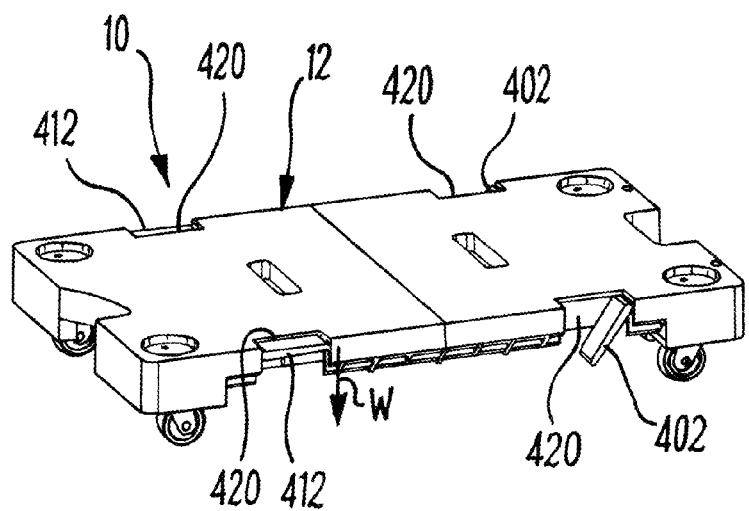
FIG. 29B is a perspective view showing a combination dolly-pallet having the return assembly in the position shown in FIG. 29A.

FIGS. 28A and 29A show a return assembly 410 comprising the further camshaft 306, which is rotatably mounted in the body 12 of the dolly-pallet 10 for rotation about its main longitudinal axis. The return assembly 410 further includes two fixed return levers in the form of fixed return pedals 412 provided at the respective opposite ends of the further camshaft 306. The fixed return pedals 412 are fixedly attached to the further camshaft 306, for example by welding.

Figure 28B:
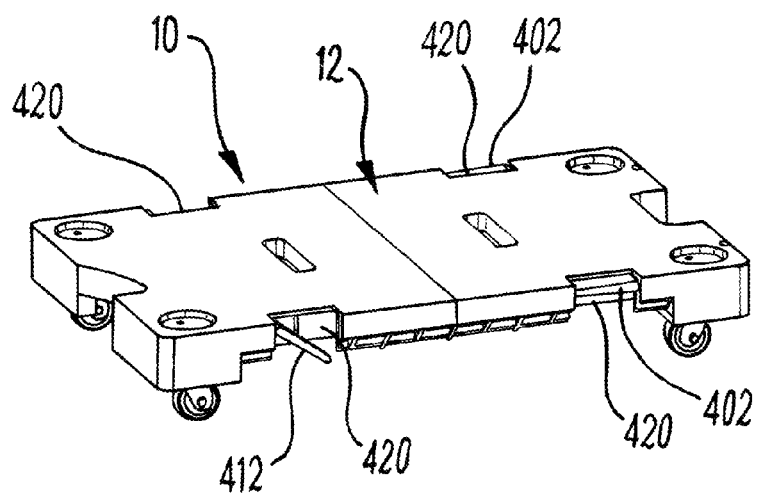
FIG. 28B is a perspective view showing a combination dolly-pallet having the return assembly in the position shown in FIG. 28A.

The return assembly 410 further includes further urging formations 403B which comprise the same features, and function in the same way, as the urging formations 403A discussed above. A further impelling member 60A is shown in FIGS. 28A and 28B. The impelling member 60A is the same as the impelling member 60. A cross member 414 extends between the arms 66 of the impelling member 60A. The cross member 414 is received by the hook portion 406 of the further urging formations 403B.

FIG. 28A shows the impelling member 60A in the first position, with the linkages 68 in their closed positions. The impelling member 60A is connected to the impelling member 60 shown in FIGS. 26A and 27A by the elongate connecting member 36.

When the drive assembly 401 drives the impelling members 60 from the first to the second positions in the direction of the arrow T in FIG. 26A (and also in FIG. 28A), the impelling members 60A are driven in the same direction. As a result, linkages 68 move to their open position, as shown in FIG. 29A.

The cross member 414 engages the urging member 403B and causes the further camshaft 306 to rotate about its longitudinal axis in the direction shown by the arrow U in FIG. 28A. This moves fixed return pedals 412 from a depressed position (shown clearly in FIG. 28B) to a raised position (shown clearly in FIG. 29B).

As explained above, the movement of the impelling members 60, 60A to the first positions moves the ground engaging members 124, 126, 128, 130 to their ground engaging positions.

When it is desired to move the ground engaging members 124, 126, 128, 130 to their retracted positions, the impelling members 60 and 60A are returned to their first positions, shown in FIGS. 26A and 28A. This is done by depressing one or other of the fixed return pedals 412 from its raised position to its depressed position, as indicated by the arrow W. This causes the further camshaft 306 to rotate and the further urging member 403B to engage the cross member 414 and urge the impelling member 60A in the direction indicated by the arrow V in FIG. 29A.

The elongate connecting member 36 transmits the movement of the impelling member 60A to the impelling member 60 shown in FIG. 27A, thereby causing the impelling member 60 to move in the direction indicated by the arrow V in FIG. 27A. This movement of the impelling member 60 drives the urging member 403A and rotates the camshaft 206 in the direction indicated by the arrow P, thereby moving the fixed drive pedals from the depressed position shown in FIGS. 27A and 27 B to the raised position shown in FIGS. 26A and 26B.

FIGS. 26A to 29B show only two impelling members 60, 60A. However, an additional two impelling members, and the associated components held thereby, are provided. The additional impelling members are connected to each other by an elongate connecting member. FIGS. 26A to 29B show an additional urging formation 403A and an additional further urging formations 403B that are depicted as unused in FIGS. 28A and 29A. The additional two impelling members co-operate with the additional urging members 403A and further urging members 403B.

FIGS. 26B, 27B, 28B and 29B show a combination dolly-pallet 10 which is similar to the combination dolly-pallet 10 described above, but differs in that the body 12 defines four recesses 420 in which the fixed drive pedals 402 and the fixed return pedals 412 are received, thereby providing protection for the pedals 402, 412.

The camshaft 206 is shown without the drive formation 210, the return formation 280. The further camshaft 306 is shown without the further return formation 380. The drive formation 210, the return formation 280 and the further return formation 380 could be provided on the camshaft 206 and the further camshaft 306 shown in FIGS. 26A, 27A, 28A and 29A, where appropriate, to allow the drive pedal 202, the return lever 203 and the further return lever 303 to be used with the further drive assembly 401 and the return assembly 410.

The invention claimed is:

1. A displacement arrangement for use in a combination dolly-pallet, the displacement arrangement comprising:
   an impelling member movable between first and second positions;
   a linkage pivotally connected to the impelling member, whereby, when the impelling member moves between the first and second positions, the linkage moves pivotally relative to the impelling member between closed and open positions;

a return assembly for returning the impelling member from the second position to the first position, thereby pivotally moving the linkage relative to the impelling member to the closed position; and a lever arrangement pivotally movable from a rest position, and a cam arrangement to transmit a force from the lever arrangement to the impelling member to drive the impelling member from the first position to the second position;

wherein the cam arrangement comprises:

an elongate rotatable main part; and a drive formation configured to slidably engage the lever arrangement, the drive formation being configured so that movement of the lever arrangement from the rest position can urge the drive formation and thereby rotate the cam arrangement in a drive direction to urge the impelling member to the second position.

2. A displacement arrangement according to claim 1, wherein the impelling member has a connecting part and a holding part, the connecting part being configured to allow the impelling member to be connected to another impelling member.

3. A displacement arrangement according to claim 2, wherein the holding part comprises two arms extending from the connecting part, the linkage being provided between the arms of the holding part, and the linkage being pivotally attached to the holding part.

4. A displacement arrangement according to claim 1, wherein the lever arrangement is pivotally movable between a rest position and an operative position, the lever arrangement applying said force to the cam arrangement when the lever arrangement moves from the rest position, and wherein the cam arrangement comprises an urging formation for urging the impelling member between the first position and the second position, the urging formation extending radially from the main part to be received by the impelling member.

5. A displacement arrangement according to claim 4, wherein the drive formation extends radially outwardly from the main part to engage the lever arrangement.

6. A displacement arrangement according to claim 5, wherein the lever arrangement comprises a fixed drive lever which is fixedly attached to the cam arrangement, the fixed drive lever being rotatable in the drive direction to rotate the cam arrangement in the drive direction.

7. A displacement arrangement according to claim 4, wherein the impelling member has a holding part comprising two arms, and wherein the impelling member includes a pair of cross members extending between the arms of the holding part, the urging formation being received between the cross members, whereby the urging formation engages one of the cross members of the impelling member to urge the impelling member to the second position, and the urging formation engages the other of the cross members of the impelling member to urge the impelling member towards the first position.

8. A displacement arrangement according to claim 1, wherein the return assembly comprises a return lever and a return formation, the return formation extending radially outwardly from the main part of the cam arrangement, and the return lever being movable from a rest position of the return lever to an operative position of the return lever to urge the return formation and thereby to urge the impelling member towards the first position.

9. A displacement arrangement according to claim 8, wherein the return assembly comprises a further cam arrangement for urging the impelling members from the second position to the first position, the further cam arrangement including a further main part and a further return formation extending radially outwardly from the further main part.

10. A displacement arrangement according to claim 9, wherein the return assembly includes a further return lever movable from a rest position of the further return lever to an operative position of the further return lever to urge the further return formation and thereby to urge the impelling member towards the first position.

11. A displacement arrangement according to claim 9, wherein the return assembly comprises a fixed return lever which is fixedly attached to the further cam arrangement, the fixed return lever being rotatable in a return direction to rotate the further cam arrangement also in the return direction and move the impelling member towards the first position.

12. A displacement arrangement according to claim 1, wherein the linkage comprises an upper link member and a lower link member, each link member being pivotally attached to the respective impelling member.

13. A displacement arrangement according to claim 12, including a reaction portion, wherein the upper link member extends from the impelling member to the reaction portion, the upper link member being pivotally attached to the reaction portion, and wherein the lower link member extends from the impelling member to a ground engaging arrangement, the lower link member being pivotally attached to the ground engaging arrangement.

14. A displacement arrangement according to claim 12, wherein when the impelling member is in the first position, the upper and lower link members extend along the impelling member, and when the impelling member is in the second position, the upper and lower link members extend transverse to the impelling member.

15. A displacement arrangement according to claim 13, wherein when the impelling member moves to the second position to move the ground engaging arrangement to a ground engaging position, each of the upper and lower link members moves to an over centre position beyond a position in which the upper and lower link members are aligned with the each other, thereby locking the ground engaging arrangement in said ground engaging position.

16. A support assembly comprising: a displacement arrangement as claimed in claim 1; a ground engaging arrangement associated with the displacement arrangement, the ground engaging arrangement being movable between a ground engaging position and a retracted position; and a reaction portion; wherein the linkage extends between the reaction portion and the ground engaging arrangement; whereby, when the impelling member moves between the first and second positions, the linkage moves pivotally relative to the impelling member to move the ground engaging arrangement between the retracted position and the ground engaging position.

17. A support assembly according to claim 16, wherein the displacement arrangement further includes a guide arrangement to guide the aforesaid pivoting movement of the linkage relative to the impelling member, the guide arrangement extending from the reaction portion to the ground engaging arrangement.

18. A support assembly according to claim 17, wherein the guide arrangement comprises an elongate guide member, the guide member extending through the respective ground engaging arrangement, and wherein the guide arrangement comprises a resilient member to move the ground engaging arrangement to the retracted position from the ground engaging position, whereby when said impelling member moves from the second position towards the first position, the resilient member moves the ground engaging arrangement to the retracted position.

19. A support assembly according to claim 18, wherein the guide arrangement includes a head attached to a lower end of the guide member, the resilient member extending from the head along the guide member to the ground engaging arrangement, and wherein the resilient member urges the ground engaging arrangement towards the reaction portion.

20. A support assembly according to claim 18, comprising first and second of the displacement arrangements and first and second of the ground engaging arrangements associated respectively with the first and second displacement arrangements, and the support assembly further comprises an elongate bearer portion having a substantially flat lower surface, and wherein each displacement arrangement further includes an upwardly extending mounting member attached to the bearer portion at the opposite ends of the bearer portion to mount the bearer portion on a body of the combination dolly-pallet.

21. A support assembly according to claim 17, wherein the ground engaging arrangement comprises a shield portion defining a cavity, and wherein the displacement arrangement further includes an upwardly extending mounting member, the shield portion being attached to the mounting member and extending laterally therefrom, the mounting member defining a guide cavity in which the guide arrangement is received.

22. A support assembly according to claim 16, wherein the ground engaging arrangement comprises a ground engaging member and an attachment member attached to the ground engaging member, the linkage being pivotally attached to the attachment member.

23. A support assembly according to claim 22, wherein a compression member is provided on the ground engaging member, the compression member being compressed when the ground engaging member engages the ground.

24. A support assembly according to claim 23, wherein the compression member is disposed between the ground engaging member and the attachment member.

25. A combination dolly-pallet comprising a body, a plurality of the support assemblies as claimed in claim 16 mounted on the body; and a drive assembly for driving the support assemblies.

* * * * *